(12) United States Patent
Andreadakis

(10) Patent No.: US 11,146,387 B1
(45) Date of Patent: Oct. 12, 2021

(54) RANDOM POSITION CIPHER ENCRYPTION USING AN APERIODIC PSEUDO-RANDOM NUMBER GENERATOR

(71) Applicant: Panagiotis Andreadakis, Alimos (GR)

(72) Inventor: Panagiotis Andreadakis, Alimos (GR)

( * ) Notice: Subject to any disclaimer, the term of this patent is extended or adjusted under 35 U.S.C. 154(b) by 0 days.

(21) Appl. No.: 16/984,439

(22) Filed: Aug. 4, 2020

(51) Int. Cl.
*H04L 9/00* (2006.01)
*H04L 9/06* (2006.01)
*H04L 9/08* (2006.01)

(52) U.S. Cl.
CPC .......... *H04L 9/0668* (2013.01); *H04L 9/0618* (2013.01); *H04L 9/0869* (2013.01)

(58) Field of Classification Search
CPC .... H04L 9/0668; H04L 9/0618; H04L 9/0869
USPC .......................................................... 380/46
See application file for complete search history.

(56) References Cited

U.S. PATENT DOCUMENTS

| | | | | |
|---|---|---|---|---|
| 5,600,723 A * | 2/1997 | Woodall | ................. | B60R 25/04 123/179.2 |
| 5,602,917 A * | 2/1997 | Mueller | ................. | H04L 9/0841 380/259 |
| 2002/0094081 A1* | 7/2002 | Medvinsky | ........... | H04M 7/006 380/44 |
| 2003/0005005 A1* | 1/2003 | Schmidt | .................. | G06F 7/582 708/250 |
| 2007/0244951 A1* | 10/2007 | Gressel | ................. | H04L 9/0668 708/252 |
| 2008/0294707 A1* | 11/2008 | Suzuki | .................. | B60R 25/042 708/250 |
| 2014/0112469 A1* | 4/2014 | Layne | ................... | H04L 9/0618 380/44 |

(Continued)

OTHER PUBLICATIONS

Text Encryption Algorithms based on Pseudo Random Number Generator Mina Mishra, V.H. Mankar International Journal of Computer Applications vol. 111—No. 2, pp. 1-6, Feb. 2015 (Year: 2015).*

(Continued)

*Primary Examiner* — Samson B Lemma
*Assistant Examiner* — Mohammad S Shams
(74) *Attorney, Agent, or Firm* — Franco S. De Liguori; DP IP Group

(57) ABSTRACT

The present innovative solution increases security to interceptor attacks and loss of cipher-characters, while not negatively impacting the processing resource and time requirements of cryptography processes. A novel Synchronous and Self-Synchronous Random Position Cipher (RPC) with arbitrary length key cryptography methodology and apparatus are presented which are based on a novel Aperiodic Pseudo-Random Number Generator (APRNG) using large seed numbers. The RPC does not replace plaintext characters with encryption characters but with the number of pseudo-random numbers that need to be generated by the APRNG to match the ASCII codes of the characters in the plaintext. Decryption uses the number of pseudo-random numbers that need to be generated by the APRNG to match the ASCII codes of the plaintext characters. Variations to the starting and reset points for the counter are also presented for improving performance when cipher-characters are lost and for avoiding increasing the size of the ciphertext as opposed to the basic methodology.

18 Claims, 19 Drawing Sheets

(56) References Cited

U.S. PATENT DOCUMENTS

| | | | | |
|---|---|---|---|---|
| 2014/0280414 A1* | 9/2014 | Greiner | ............... | G06F 9/3001 |
| | | | | 708/254 |
| 2018/0205536 A1* | 7/2018 | Tomlinson | ............... | G09C 5/00 |
| 2020/0328886 A1* | 10/2020 | Newton | ............... | H04L 9/0869 |
| 2020/0374100 A1* | 11/2020 | Georgieva | ............ | H04L 9/3093 |

OTHER PUBLICATIONS

Symmetric Encryption Algorithm using ASCII Values Uma Pujeri, Ramachandra Pujeri International Journal of Recent Technology and Engineering (IJRTE), vol. 8, Issue-5, pp. 2355-2359, Jan. 2020 (Year: 2020).*

Pseudo Random Bit Generator using Logistic and Bernoulli Maps P. Jhansi Rani ICTCS '16: Proceedings of the second International Conference on Information and Communication Technology for Competitive Strategies. Mar. 2016, Article No. 71, pp. 1-6 (Year: 2016).*

A Pseudo Random Bit Generator Based on Chaotic Logistic Map and its Statistical Testing Vinod Patidar, K.K. Sud, N.K. Pareek Informatica, 2009, Department of Basic Sciences, School of Engineering, Sir Padmapat Singhania University, Bhatewar, Udaipur—313 601, India. May 20, 2008, pp. 1-12 (Year: 2008).*

Pseudo Random Number Generation Using Hardware Implementation of Elementary Cellular Automata William A. Schenck A Thesis Submitted in Partial Fulfillment for the Requirements for the Degree of Master of Science in Engineering Technology Middle Tennessee State University. Dec. 2016 (Year: 2016).*

* cited by examiner

| $h_0$ →→ | Mul. as in T.1 →→ ⋮ →→ | $R_1 ... R_{12}$ ↓ ... ↓ | | | $R_0$ ... |
|---|---|---|---|---|---|
| | $h_1$ →→ | Mul. as in T.1 →→ ⋮ →→ | $R_{13} ... R_{27}$ ↓ ... ↓ | | $R_{13}$ ... |
| | | $h_2$ →→ | Mul. as in T1 →→ ⋮ →→ | $R_{28} ... R_{45}$ ↓ ... ↓ | $R_{28}$ ... |
| | | | ... | .... | ... |
| | | | $h_u$ | ... | ... |

FIG. 15

| $h_0$ → | Create/ Update T.H ↓ | | | | |
|---|---|---|---|---|---|
| a → | Create/ Update T.CR as T.3 ← | Create T.M | | | |
| | Lookup $R_i$ at T.CR use H,L,C | $R_1 ... R_{12}$ ↓ ... ↓ | | → | $R_1 ... R_{12}$ |
| | $h_1$ → | Lookup $R_i$ at T.CR use H,L,C | $R_{13} ... R_{27}$ ↓ ... ↓ .... | → | $R_{13} ... R_{27}$ |
| | | $h_2$ → | Lookup $R_i$ at T.CR use H,L,C | $R_{28} ... R_{45}$ ↓ ... ↓ | → $R_{28} ... R_{45}$ |
| | | | ... | ... | ... |
| | | $h_2$ → | ... | ... | |

FIG. 16

RANDOM POSITION CIPHER ENCRYPTION USING AN APERIODIC PSEUDO-RANDOM NUMBER GENERATOR

BACKGROUND

Field

The present invention relates to data encryption based on random position ciphers and arbitrary big key lengths using Aperiodic Pseudo-Random Number (APRN) sequences of large numbers.

Background

Cryptography is an interdisciplinary field of study, development and use of encryption and decryption techniques for the purpose of concealing the content of messages. It is defined as the system by which data and information of value are stored or transmitted in such a way that only those for whom data are intended can read, interpret or process them. Effectively, cryptography obscures information from unauthorized snoopers and interceptors. In the same way, cryptography can be used to hide dubious and clandestine activities in our modern cyber world today. Cryptography refers to the design of mechanisms based on mathematical algorithms that provide fundamental information security services. PRNGs (Pseudo-Random Number Generators) are also used in cryptography where the seed is kept secret so as to prevent hackers from calculating the next numbers in the sequence of pseudo-random numbers produced by the generator.

Three main categories of cryptography methods and systems are known in prior art:
- public-key cryptography
- secret-key cryptography
- hash functions In public-key cryptography the encryption-decryption key is openly available to any person or system. Hash functions are secret functions or tables used to lookup substitutions of original input data characters to new characters used for encrypting the data and for subsequent decryption. They are very easy and fast to use and only need to be created once. However, they can be stolen or calculated by an interceptor, usually with limited processing and experimentation.

Secret-key cryptography is the category of choice where high levels of security are needed, as in banking, military, and other critical applications. Secret-key cryptography works on the assumption that the encryption and decryption keys are kept secret from all but the sender and receiver and is subdivided into block cipher and stream cipher.

In block cipher the input data stream is broken into blocks of length equal to the secret key and is encoded and decoded in parts according to the blocks. As a result, smaller keys can be used for ease of key creation, and simplification and speed of the calculations involved in the encoding and decoding operations.

In stream cipher methods, long secret keys are constructed, matching the length of the input text. Despite the heavier processing involved by stream ciphers, the methods using stream ciphers are more secure as the key is not repeated (as with block ciphers) and is more difficult to be guestimated by an interceptor.

Stream ciphers are also divided into synchronous and self-synchronous stream ciphers.

A synchronous cipher is a stream cipher, in which the keystream is generated independently of the plaintext and of the ciphertext. The keystream is usually produced by a pseudorandom generator, parameterized by a key/Seed, which is the secret key of the whole scheme.

In a synchronous stream cipher, the sender and receiver must be exactly in step for decryption to be successful. If digits are added or removed from the message during transmission, synchronization is lost. To restore synchronization, various offsets can be tried systematically to obtain the correct decryption. Another approach is to tag the ciphertext with markers at regular points in the output.

If, however, a digit is corrupted in transmission, rather than added or lost, only a single digit in the plaintext is affected and the error does not propagate to other parts of the message. This property is useful when the transmission error rate is high; however, it makes it less likely for the error to be detected without further mechanisms.

To overcome the limitations of synchronous stream cipher methods, self-synchronous stream cipher methods may be used, which use several of the previous N ciphertext digits to compute the keystream. Such schemes are also known as asynchronous stream ciphers or ciphertext autokey (CTAK). The idea of self-synchronization was patented in 1946 and has the advantage that the receiver will automatically synchronize with the keystream generator after receiving N ciphertext digits, making it easier to recover if digits are dropped or added to the message stream. Single-digit errors are limited in their effect, affecting only up to N plaintext digits However, this self-synchronous solution comes at a performance cost (i.e. expanding the original data size).

To further complicate the situation, encryption methods known in prior art for all the above categories and subcategories rely on mathematical theories to create keys. Typically, pseudo random number generators are used to produce pseudo random numbers which are intended to be hard to guess to any interceptor of the encrypted data stream. The problem with these generators, as their name suggests, is that the numbers they produce are not truly random as they are produced by a method that an interceptor can have access to or guess it together with a seed value that triggers the method. In reality pseudo random number sequences are not truly random number sequences but random numbers which appear random and which have a finite period. This last characteristic makes pseudo random number generators taught in prior art to have a periodicity that allows interceptors to analyze them and guess the numbers in the sequence and their orders, thereby, rendering encryption methods using such numbers not secure to brut-force attacks.

All the known methods operate on the characters of the input (i.e. unencrypted) data and try to find a hard-to-guess substitution of the original characters with new characters. Each method has its advantages and drawbacks and proposes character substitutions ranging from simple hash functions to more complicated self-synchronous stream ciphers.

It is clear from the above discussion, that known encryption methods do not offer very high protection against interception and have high computational costs in terms or processing power and processing time for increasing their security and for ensuring self-synchronization.

There is, therefore, a need for an encryption methodology that offers significantly higher security than known encryption methodologies, while it is fast and easy to compute even with limited processing resources.

SUMMARY

The present innovative solution solves the problem encountered in cryptography for increased security to interceptor attacks, while not negatively impacting the processing and time requirements for the encryption and decryption processes.

In a first exemplary implementation, a Self-Synchronous Random Position Cipher (RPC) Encryption/Decryption methodology and computing apparatus are presented. The Synchronous RPC uses a novel Aperiodic Pseudo-Random Number Generator (APRNG) to produce pseudo random numbers with practically infinite period (i.e. accurately approximating real random numbers), starting from a very long seed number constructed from one or more computer clock readings, and a very long multiplier number produced by selecting a set of digits from the seed number. For every new pseudo-random number produced, the seed number is set to the value of the previous pseudo-random number. The generation of the multiplier ensures that the pseudo-random numbers produced by the APRNG fall inside the interval (0 . . . 255). The choice of the interval is not random but corresponds to the ASCII codes for common characters used in computing.

During encryption, the Synchronous RPC reads a plaintext that is to be encrypted, substitutes the characters in the plaintext with the corresponding ASCII codes, and commands the APRNG to generate a series of pseudo-random numbers until a starting point is reached. After the starting point, the APRNG continues generating pseudo-random numbers and counts the generated pseudo-random numbers until a match is found between a pseudo-random number and the next ASCII character in the plaintext. The count is stored by the Synchronous RPC as the encrypted character for the plaintext character and the process is repeated until all characters in the plaintext have been encrypted. The resulting encrypted character sequence is output by the Synchronous RPC encrypted and can be transmitted to one or more receivers together with the secret key, made up of the seed number, the positions of characters in the seed number for constructing the multiplier, the length of the pseudo-random numbers, and the starting point in the pseudo random sequence for starting the counter.

During Synchronous RPC decryption, the secret key (the same as the secret key used for encryption) is processed to extract the seed number, the length of the pseudo-random numbers, and the starting point in the pseudo random number sequence for starting the counter, and the multiplier is constructed from the seed number and the selected positions in the seed number. These data are then fed by the Synchronous RPC decryptor to the APRNG for generating pseudo-random numbers in the range (0 . . . 255) until the pseudo-random number corresponding to the starting point is reached. The Synchronous RPC decryptor then starts a counter, generates as many pseudo-random numbers as the first encrypted character (i.e. a number) in the ciphertext, and stores the last pseudo-random number generated as the ASCII character corresponding to the original ciphertext character. The process is repeated for all remaining characters in the ciphertext, producing and storing an equal number of ASCII characters corresponding to the original plaintext characters. The stored ASCII characters corresponding to the original plaintext characters are converted to the original plaintext characters and are outputted by the Synchronous RPC decryptor and can then be used for any purpose.

In the Synchronous RPC encryption and decryption methodologies, the counter is initially reset and started at the starting point, and then is reset and restarted at every match between a generated pseudo-random number and plaintext character, effectively counting the pseudo-random numbers generated between the starting point or the previous plaintext and the next plaintext character match.

In a second exemplary implementation, a Synchronous Random Position Cipher (RPC) Encryption/Decryption methodology and computing apparatus are presented. The advantage of the Self-Synchronous Random Position Cipher is to offer robustness to loss of encrypted characters during transmission as a result of imperfect communication channels or interception by a malicious third party. The only difference between the first the second exemplary implementations is that in the second exemplary implementation the Self-Synchronous Random Position Cipher counter is started from the starting point in the pseudo-random number sequence and is not reset for the duration of the encryption or decryption operations, effectively counting the pseudo-random numbers generated between the starting point and the next plaintext character match. As a result, loss of cipher-characters during transmission only affect a single character and do not propagate to the following characters (as in the first exemplary implementation).

In a third exemplary implementation, a Periodically Resetting Self-Synchronous Random Position Cipher (RPC) Encryption/Decryption methodology and computing apparatus are presented. The advantages of the Periodically Resetting Self-Synchronous Random Position Cipher are robustness to loss of encrypted characters during transmission as a result of imperfect communication channels or interception by a malicious third party (as opposed to the Synchronous Random Position Cipher), and the reduction of the size of the resulting ciphertext (as opposed to the Self-Synchronous Random Position Cipher). The only difference between the first, the second, and the third exemplary implementations is that the Periodically Resetting Self-Synchronous Random Position Cipher counter is started from the starting point in the pseudo-random number sequence and is reset and started every time the $X^{th}$ character is encrypted or decrypted, effectively counting the pseudo-random numbers generated between the starting point and the next plaintext character match, and repeating every $X^{th}$ encrypted or decrypted character. As a result, loss of cipher-characters during transmission only affect a single character and do not propagate to the following characters (as in the first exemplary implementation), and the size of the resulting ciphertext is not increased as the counts (i.e. the cipher-characters) are artificially made small numbers (as opposed to the second exemplary implementation where the counts are continuously growing and can reach very large sized for large plaintexts).

In a fourth exemplary embodiment the Self-Synchronous RPC cipher is started from the starting point in the pseudo-random number sequence and is reset and started every time the $X^{th}$ character is encrypted or decrypted, effectively counting the pseudo-random numbers generated between adjacent plaintext character matched, and resetting every $X^{th}$ encrypted or decrypted character.

In a fifth exemplary embodiment, the third exemplary embodiment is modified by replacing the constant value X with a random number produced by the APRNG.

In a sixth exemplary embodiment, the fourth exemplary embodiment is modified by replacing the constant value X with a random number produced by the APRNG.

The present solution is, in effect a new category of cryptography methodologies, as it does not substitute a plaintext symbol with a ciphertext symbol as done by any cryptography algorithm in the prior art. Instead, the present solution represents each plaintext character with the number of pseudo-random numbers that need to be generated by the innovative APRNG until the last generated pseudo-random number matches the current plaintext character that is to be encrypted or decrypted. As a result, the present methodologies and computing apparatuses fall into a new category, provisionally termed "Synchronous RPC encryption/decryption algorithms", which offer far superior performance than cryptography algorithms in the prior art.

BRIEF DESCRIPTION OF THE DRAWINGS

FIG. 15 illustrates a Table 4 showing multiplications for the creation of a sequence of random numbers.

FIG. 16 illustrates a Table 5 showing the simplification of the multiplications for the creation of a sequence of random numbers.

DETAILED DESCRIPTION

Figure 1:
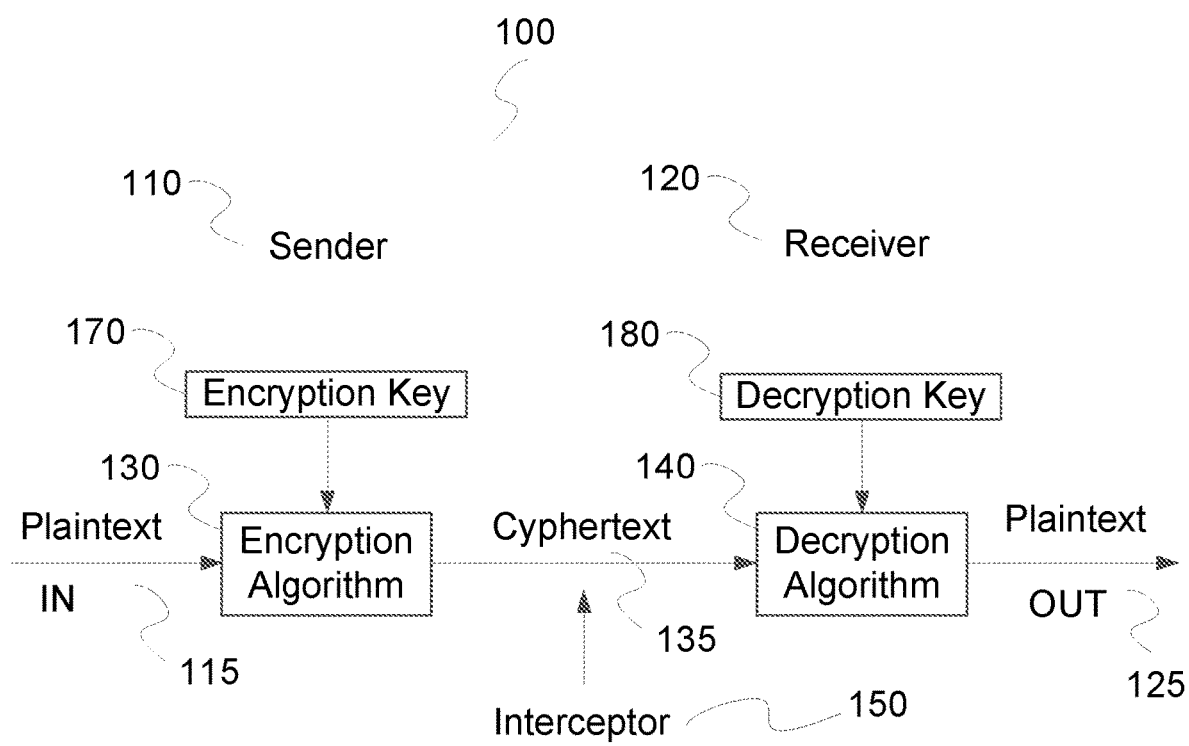
FIG. 1 shows a cryptography system known in prior art.

The word "exemplary" is used herein to mean "serving as an example, instance, or illustration". Any embodiment described herein as "exemplary" is not necessarily to be construed as preferred or advantageous over other embodiments.

The acronym "APRNG" is intended to mean "Aperiodic Pseudo-Random Number Generator".

The acronym "ASCII" is intended to mean "American Standard Code for Information Interchange".

The acronym "CD" is intended to mean "Compact Disc".

The acronym "DSL" is intended to mean "Digital Subscriber Line".

The acronym "DVD" is intended to mean "Digital Versatile Disc".

The acronym "LAG" is intended to mean "Linear Analog Generator".

The acronym "PRN" is intended to mean "Pseudo-Random Number".

The acronym "RPC" is intended to mean "Random Position Cipher".

The acronym "PRNG" is intended to mean "Pseudo-Random Number Generator".

The acronym "RNG" is intended to mean "Random Number Generator".

The acronym "XML" is intended to mean "eXtensible Markup Language".

The term "mobile device" may be used interchangeably with "client device" and "device with wireless capabilities".

The term "user" may be used interchangeably with "regular user", "ordinary user", and "client". It may also be used to mean "user of an application" or "user of a service".

The term "system" may be used interchangeably with "device", "computing device", "apparatus", "computing apparatus", and "service", except where it is obvious to a reader of ordinary skill in related art that these terms refer to different things, as this is apparent by the context of the discussion in which they appear. Under any circumstance, and unless otherwise explicitly stated or implicitly hinted at in the description, these four terms should be considered to have the broadest meaning i.e. that of encompassing all four.

The term "module" may be used interchangeably with "unit" or "subunit", except where it is obvious to a reader of ordinary skill in related art that these terms refer to different things, as this is apparent by the context of the discussion in which they appear.

The term "big" may be used interchangeably with "large", except where it is obvious to a reader of ordinary skill in related art that these terms refer to different things, as this is apparent by the context of the discussion in which they appear.

Parameters and names in lower-case and upper-case characters are intended to mean the same thing except where it is obvious to a reader of ordinary skill in related art that these terms refer to different things, as this is apparent by the context of the discussion in which they appear, or where a different meaning is disclosed in the following description.

Definitions

Plaintext is the data to be protected during transmission.

Encryption Algorithm is a mathematical process that produces a ciphertext for any given plaintext and encryption key. The encryption algorithm is a cryptographic algorithm that takes plaintext and an encryption key as input and produces a ciphertext.

Ciphertext is the different version of the plaintext produced by the encryption algorithm using a specific encryption key. The ciphertext is not guarded and may be transmitted on a public channel. The ciphertext may be intercepted or compromised by anyone who has access to the communication channel.

Decryption Algorithm is a mathematical process that produces a unique plaintext for any given ciphertext and decryption key. The decryption algorithm is a cryptographic algorithm that takes a ciphertext and a decryption key as input, and outputs a plaintext. The decryption algorithm essentially reverses the encryption algorithm and is thus closely related to it.

Encryption Key is a value that is known to the sender. The sender inputs the encryption key into the encryption algorithm along with the plaintext in order to compute the ciphertext.

Decryption Key is a value that is known to the receiver. The decryption key is related to the encryption key but is not always identical to it. The receiver inputs the decryption key into the decryption algorithm along with the ciphertext in order to compute the plaintext.

Technical Characteristics of Encryption Methodologies in the Prior Art

FIG. 1 shows a cryptography system known in prior art. Typically, in a cryptography system 100, a sender 110 wants to securely transmit input data 115 (e.g. plain text, or any other type of data) over a communications channel (or via a storage medium) to a receiver 120. Input data 115 are fed at the sender's side to an encryption module (or algorithm) 130 together with an encryption key 170. Encryption module 130 applies a methodology and encryption key 170 to input data 115 to produce a ciphertext (i.e. encrypted) data 135. Ciphertext 135 is received by receiver 120 and fed to a decryption module (or algorithm) 140 together with a decryption key 180. Decryption module 140 outputs plaintext (i.e. decrypted) data 125, which is intended to be identical to input plaintext data 115.

Malicious interceptors 150 may intercept ciphertext 135 at any time after transmission from sender 110 and before or after reception by receiver 120. For interceptor to make use of ciphertext 135, he has to find a way to substitute the elements (i.e. the characters) in ciphertext 135 with characters matching the elements (i.e. the characters) in plaintext 115. In other words, interceptor 150 needs to guestimate or steal decryption key 180. Decryption key 180 may be different or the same with encryption key 170.

Technical Characteristics of the Present Innovative Random Position Cipher (RPC) Encryption Methodology Self-Synchronous RPC Static Stp Self-Synchronous RPC Encryption Synchronous stream ciphers require that the keystreams used for encryption and decryption be exactly synchronized in order to recover the plaintext from the ciphertext. Self-synchronous ciphers are very useful when the transmission error rate is high because if some part of the encrypted message is altered during transmission, the other parts of the cipher text are not affected since the sub-parts of the encrypted message are independent of each other.

Figure 2A:
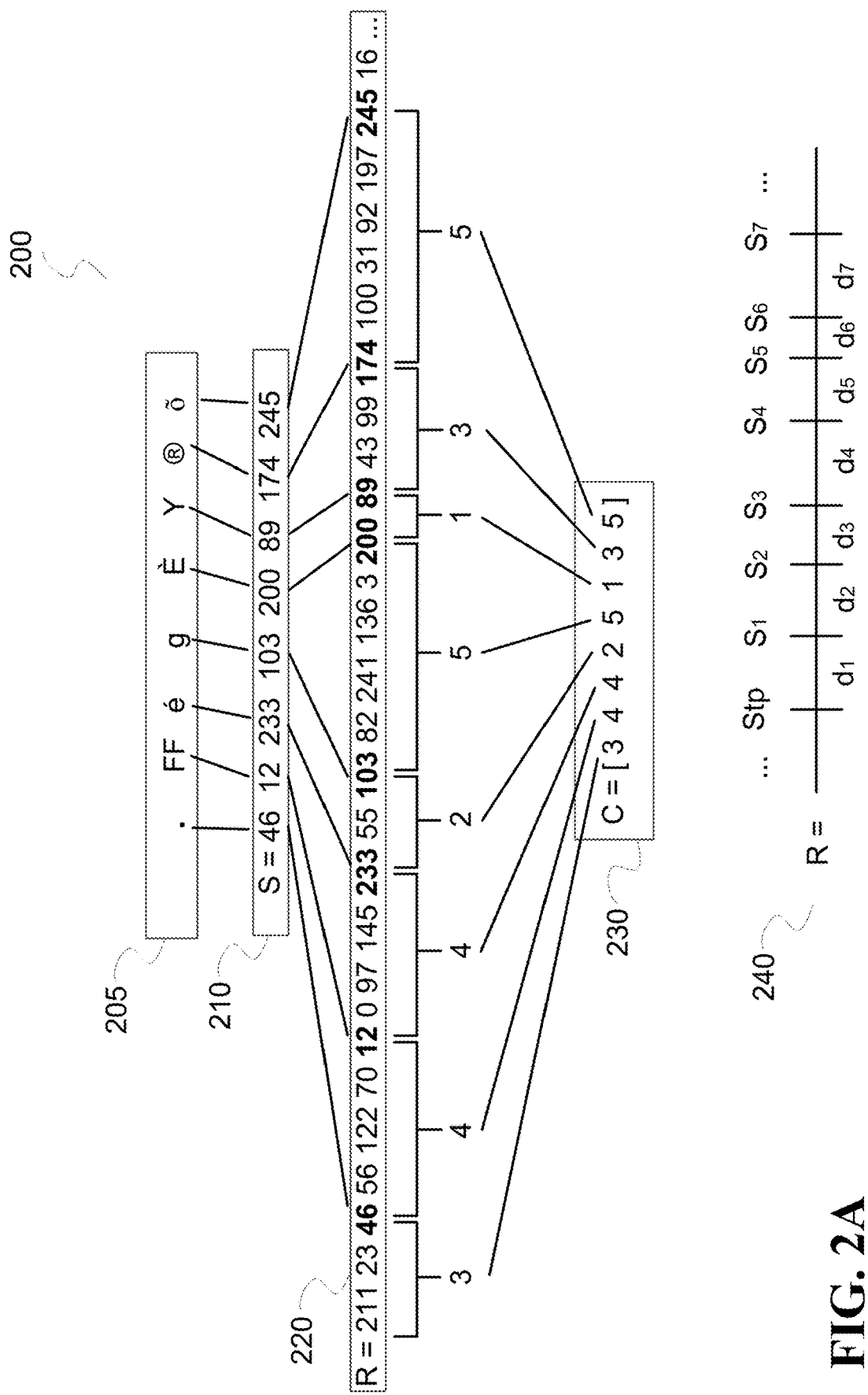
FIG. 2A shows an example encryption using the present innovative Static Stp Self-Synchronous Random Position Cipher Encryption methodology.

FIG. 2A shows an example encryption using the present innovative Static Stp Self-Synchronous Random Position Cipher Encryption methodology. Random Position Cipher (RPC) Encryption methodology 200 aims at representing an unencrypted plaintext input data stream S 210 with a cipher stream C 230. To achieve the above goal the RPC encryption methodology takes an innovative approach that is totally different than prior art approaches. RPC Encryption methodology 200 is not substituting S 210 with another character. Instead, it converts all input characters to their ASCII code (i.e. a decimal number between 0 and 255) and uses a pseudo-random number generator to produce aperiodic pseudo random numbers of large size, which are used to construct pseudo random numbers (i.e. "normalized") between 0 and 255. Starting from a random seed number, pseudo random numbers between 0 and 255 are generated until the pseudo random number equals the first ASCII character in S 210. In the example of FIG. 2A, 3 pseudo random numbers (211, 23, 46) are generated until the ASCII character 46 in S 210 is generated. The number 3, i.e. the number of pseudo-random numbers generated until the first ASCII character of S 210 is generated, is set as the first character of ciphertext (i.e. encrypted character of the original plaintext). The same process repeats for the remaining characters of S 210.

In the present example S 210 contains plaintext 205:
.FF é g È Y® δ
which is represented in ASCII as S 210:
46 12 233 103 200 89 174 245

In another example, plaintext 205 could contain the word "Goodmoming" which in ASCII is "71 111 111 100 109 111 114 110 105 110 103", etc.

To produce random numbers that match the ASCII codes in S 210, a pseudo random generator would start producing pseudo random numbers R 220, e.g.

211 23 46 (i.e. 3 random numbers for the $1^{st}$ character 46 in S 210)

56 122 70 12 (i.e. 4 random numbers for the $2^{nd}$ character 12 in S 210)

0 97 145 233 (i.e. 4 random numbers for the $3^{rd}$ character 233 in S 210)

55 103 (i.e. 2 random numbers for the $4^{th}$ character 103 in S 210)

82 241 136 3 200 (i.e. 5 random numbers for the $5^{th}$ character 200 in S 210)

89 (i.e. 1 random number for the $6^{th}$ character 89 in S 210)

43 99 174 (i.e. 3 random numbers for the $7^{th}$ character 174 in S 210)

100 31 92 197 245 (i.e. 5 random numbers for the $8^{th}$ character 245 in S 210)

etc.

Pseudo random numbers R 220 produced for each character in S 210 are each set as a character in ciphertext C 230:
3 4 4 2 5 1 3 5

C 230 may comprise larger numbers than the single-digit numbers in the present example.

FIG. 2A also shows a diagram of R and the counting of the pseudo random numbers for matching each character in S used in the Static Stp Self-Synchronous Random Position Cipher Encryption methodology. Diagram 240 provides easier visualization and shows that R is made up of a series of pseudo random numbers Stp (i.e. starting point), $S_1$, $S_2$, $S_3$, $S_5$, $S_5$, $S_6$, $S_7$, . . . The number of pseudo random numbers for matching each character in S are shown as distances $d_1$ (between Stp and $S_1$), $d_2$ (between $S_1$ and $S_2$), $d_3$ (between $S_2$ and $S_3$), $d_4$ (between $S_3$ and $S_4$), $d_5$ (between $S_4$ and $S_5$), $d_6$ (between $S_5$ and $S_6$), $d_7$ (between $S_6$ and $S_7$), . . .

So, using the distance notations of R 240, S, R and C may be represented as:
S=[$S_1$, $S_2$, $S_3$, $S_4$, $S_5$, $S_6$, $S_7$]
R=[. . . , Stp, . . . , $S_1$, . . . , $S_2$, . . . , $S_3$, . . . , $S_4$, . . . , $S_5$, . . . , $S_6$, . . . , $S_7$, . . . ]
C=[$d_1$, $d_2$, $d_3$, $d_4$, $d_5$, $d_6$, $d_7$]

Starting point Stp in the pseudo-random sequence R can be any number selected from the pseudo-random sequence without having any specific characteristic, in order to act as the beginning digit of the encryption. Stp is very important as it ensures that without it no interceptor (e.g. a cyberpunk) can decrypt the ciphertext. Without even knowing the Stp, it makes it almost impossible for the interceptor to even start the decryption. Also, there is the flexibility every time to choose a different Stp.

Figure 3A:
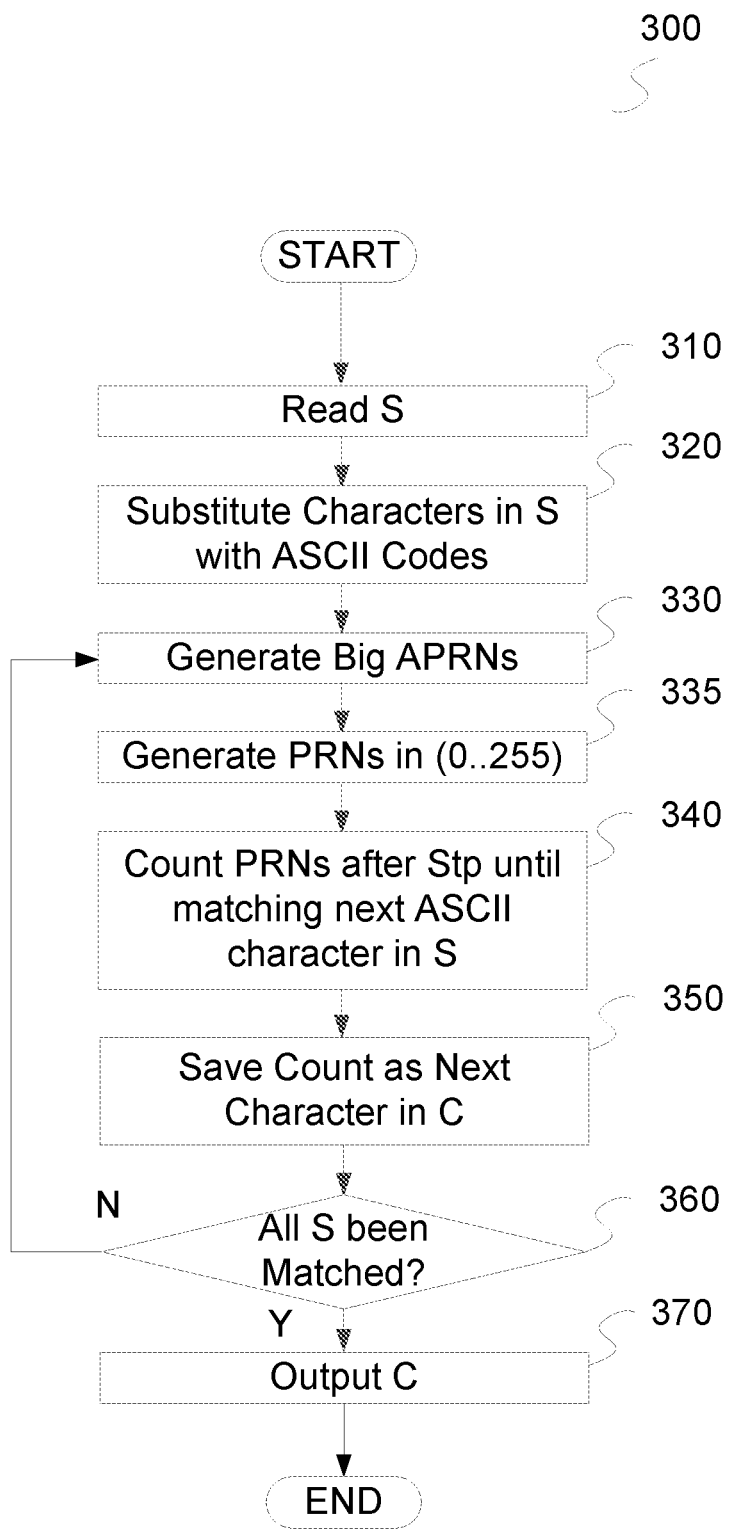
FIG. 3A shows a high-level flow diagram of the present innovative Synchronous RPC Encryption methodology.

FIG. 3A shows a high-level flow diagram of the present innovative Synchronous RPC Encryption methodology. RPC encryption methodology 300 starts with an RPC encryption module reading input plaintext S 310 and substituting each character in S with the corresponding ASCII code 320.

A set of big aperiodic Pseudo Random Numbers (PRN) is generated 330 and used to generate pseudo random numbers between (0 and 255) 335. In an alternative exemplary implementation, steps 330, 335 are merged into a single step. The number of pseudo random numbers between 0 and 255 generated until a pseudo random number matching the ASCII code for the next character in plaintext S is counted 340 and saved as the next character in ciphertext C 350. Calculations 330-350 are repeated until 360 the ASCII codes for all the characters in S have been matched by the generated pseudo-random numbers, and the ciphertext C is outputted 370.

In variations of the present Static Stp Self-Synchronous RPC Encryption, the same RPC encryption module is also used for implementing Constant Shifting Stp Self-Synchronous RPC Encryption and Random Shifting Stp Self-Synchronous RPC Encryption according to the respective methodologies described below. To implement variations of Self-Synchronous RPC Encryption, the RPC encryption module contains logic and/or software instructions that can be selectively used and/or executed for implementing a selected variation of the Self-Synchronous RPC Encryption.

Static Stp Self-Synchronous RPC Decryption

To decrypt the ciphertext, an synchronous RPC Decryption module commands the APRNG to generate pseudo-random numbers up to the Stp (starting point):

$R=\{r_1, r_2, \ldots, r_{Stp}|r_{Stp+d1}, r_{Stp+d2}, \ldots, r_{Stp+dn}\}$

After the Stp, the synchronous RPC Decryption module decryption the pseudo-random sequence R, measuring only the distances in the ciphertext:

$C=[d_1, d_2, \ldots, d_n]$

More specifically, the decryption methodology will produce $d_1$ pseudo-random numbers after the Stp, until it produces the first pseudo-random number $r_1$, which corresponds to the first ASCII code character $S_1$, and will continue for the remaining $r_i$ corresponding to the remaining $S_i$. In every repetition $d_i$ is measured from the last $r_i$.

Figure 3B:
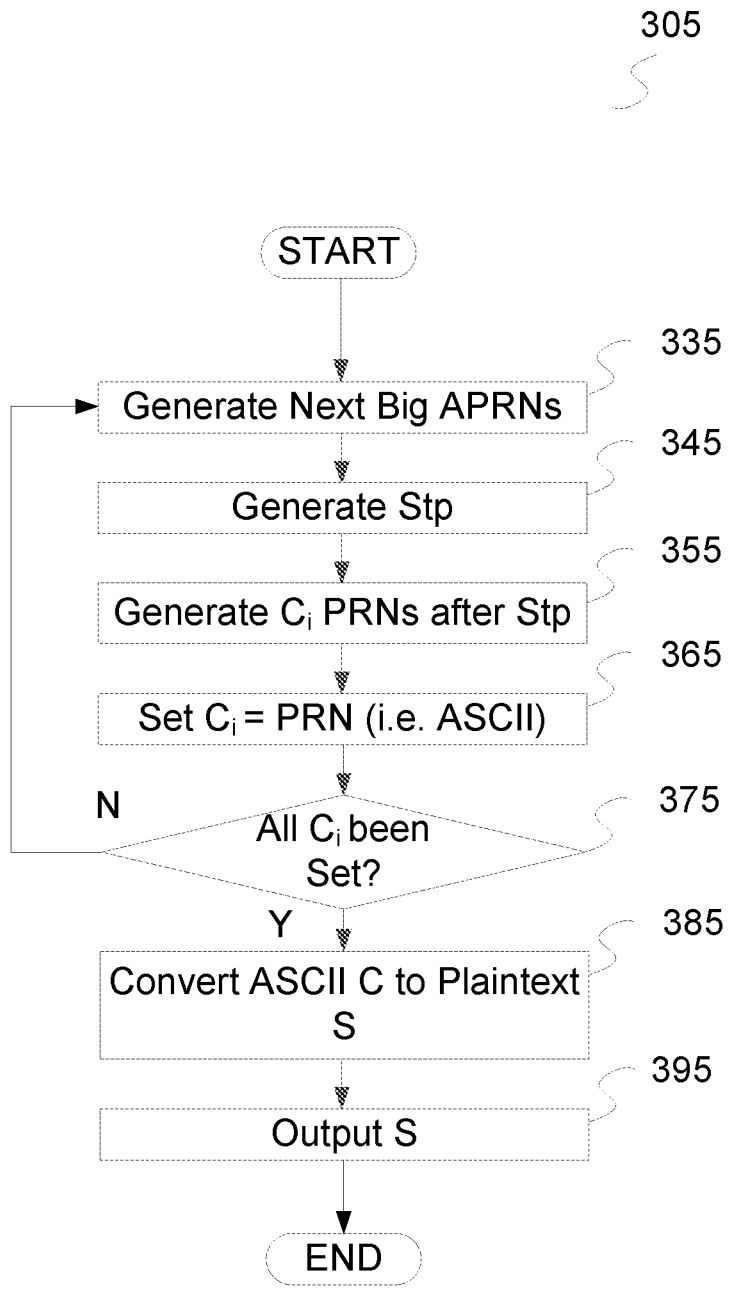
FIG. 3B shows a high-level flow diagram of the present innovative Synchronous RPC Decryption methodology.

FIG. 3B shows a high-level flow diagram of the present innovative Synchronous RPC Decryption methodology. Methodology 305 starts with the self-synchronous RPC decryption module selecting the seed number h from the secret Key 315, and constructing multiplier a 325 from the seed number h using positions $x_1, x_2, x_3, x_4, x_5, x_6, \ldots, x_N, x_{N+1}$.

The synchronous RPC decryption module commands the APRNG module to generate pseudo-random numbers 335 until the starting point Stp is reached 345 and then starts a counter counting every pseudo random number created after Stp. When the counter reaches a count matching distance $d_i$ 355 (corresponding to distance $d_i$ in FIG. 2A, the RPC decryption module sets the cipher character $c_i$ equal to the pseudo-random number $r_i$ 365, and repeats the process branching back to step 335 until all $c_i$ have been set 375 and then converts the $c_i$ (corresponding to ASCII codes) into plaintext characters $S_i$ 385 and ends methodology 305 by outputting S 395. All counts $c_i$ are measured from Stp.

In variations of the present Static Stp Self-Synchronous RPC Decryption, the same RPC decryption module is also used for implementing Constant Shifting Stp Self-Synchronous RPC Decryption and Random Shifting Stp Self-Synchronous RPC Decryption according to the respective methodologies described below. To implement variations of Self-Synchronous RPC Decryption, the RPC decryption module contains logic and/or software instructions that can be selectively used and/or executed for implementing a selected variation of the Self-Synchronous RPC decryption.

Constant Shifting Stp Self-Synchronous RPC Encryption

The methodology for the Constant Shifting Stp Self-Synchronous RPC Encryption is identical to the methodology for Static Stp Self-Synchronous RPC Encryption. The only difference is how distances $d_i$ are measured.

Figure 2B:
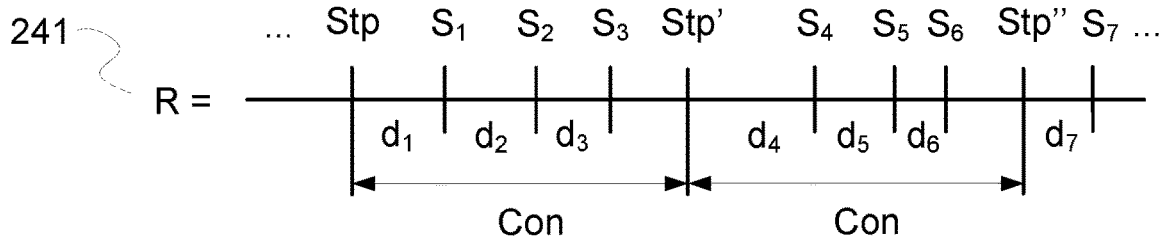
FIG. 2B shows an example encryption using the present innovative Constant Shifting Stp Self-Synchronous Random Position Cipher Encryption methodology.

FIG. 2B shows an example encryption using the present innovative Constant Shifting Stp Self-Synchronous Random Position Cipher Encryption methodology. The number of pseudo random numbers 241 for matching each character in S are shown as distances $d_1$ (between Stp and $S_1$), $d_2$ (between $S_1$ and $S_2$), $d_3$ (between $S_2$ and $S_3$).

After $S_3$, (in the example of FIG. 2B, or after a different $S_1$ in other examples) a new starting point Stp' is set, by adding a constant number to the original Stp, so that Stp'=Stp+Con. Distances past $S_3$ are now counted from Stp', resulting in $d_4$ (between Stp' and $S_4$), $d_5$ (between $S_4$ and $S_5$), $d_6$ (between $S_5$ and $S_6$). A new Stp"=Stp'+Con is set after $S_6$ (not shown) and distances are now counted from Stp", $d_7$ (between Stp" and $S_7$), . . . (not shown). This way, the use of constantly shifting starting points ensures that if a character in S is lost, then the error will not propagate beyond the next starting point. For this reason, the use of the constant Con is trade-off between a low error propagation rate and a small size in C.

Constant Shifting Stp Self-Synchronous RPC Decryption

The Constant Shifting Stp Self-Synchronous RPC Decryption is identical to the Static Stp Self-Synchronous RPC Decryption, with the only difference being the counting of distance $d_1$.

Random Shifting Stp Self-Synchronous RPC Encryption

The methodology for the Random Shifting Stp Self-Synchronous RPC Encryption is identical to the methodology for Constant Shifting Stp Self-Synchronous RPC Encryption. The only difference is how the starting points are set and how distances are measured.

Figure 2C:
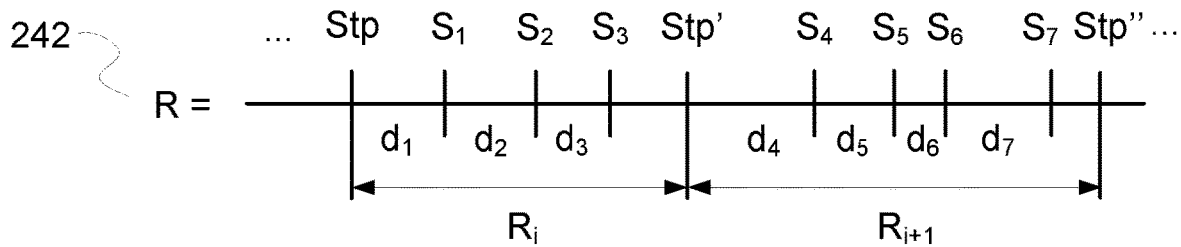
FIG. 2C shows an example encryption using the present innovative Random Shifting Stp Self-Synchronous Random Position Cipher Encryption methodology.

FIG. 2C shows an example encryption using the present innovative Random Shifting Stp Self-Synchronous Random Position Cipher Encryption methodology. The number of pseudo random numbers for matching each character in S 242 are shown as distances e.g. $d_1$ (between Stp and $S_1$), $d_2$ (between $S_1$ and $S_2$), $d_3$ (between $S_2$ and $S_3$).

A new starting point Stp' is set, by adding a pseudo-random number $R_i$, generated by the APRNG, to the original Stp, so that Stp'=Stp+R. In the example of FIG. 2C the $R_i$ is such that Stp' is set after $S_3$. In other examples a different $R_i$ would result in a Stp' at a different position. Distances past $S_3$ are now counted from Stp', resulting in $d_4$ (between Stp' and $S_4$), $d_5$ (between $S_4$ and $S_5$), $d_6$ (between $S_5$ and $S_6$). A new Stp"=Stp'+$R_{i+1}$ is then set after Stp' (not shown) and distances for S, past Stp" are then counted from Stp", $d_i$ (between Stp" and $S_i$), $d_{i+1}$ (between $S_i$ and $S_{i+1}$), . . . (not shown). This way, the use of randomly shifting starting points ensures that if a character in S is lost, then the error will not propagate beyond the next starting point, and due to the randomness of the shifting starting points, which in turn is due to the random numbers $R_i$, the complexity of the calculation of the starting points and the decryption calculations increases very significantly as is later presented. For this reason, the normalization of the length of the random numbers $R_i$ is trade-off between a low error propagation rate and a small size in C.

Random Shifting Stp Self-Synchronous RPC Decryption

The Random Shifting Stp Self-Synchronous RPC Decryption is identical to the Constant Shifting Stp Self-Synchronous RPC Decryption, with the only difference being the counting of distance $d_i$.

Synchronous RPC

Static Stp Synchronous RPC Encryption

Synchronous encryption is very useful when the transmission error rate is high because if some part of the encrypted message is altered during transmission, the other parts of the cipher text are not affected since the sub-parts of the encrypted message are independent of each other. The process for Static Stp Synchronous RPC Encryption is identical to the Static Stp self-synchronous RPC Encryption shown in FIG. 2A-FIG. 3A except from the counting of distances shown in FIG. 2A.

Figure 2D:
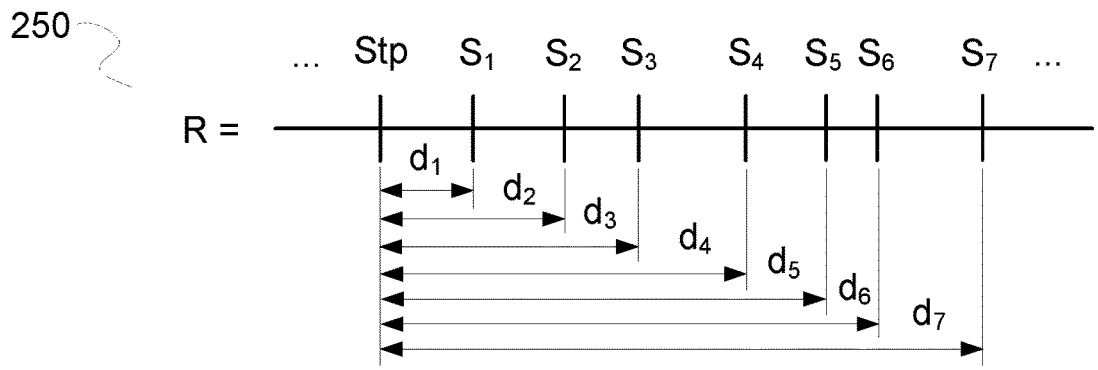
FIG. 2D shows a diagram of R and the counting of the pseudo random numbers for matching each character in S used in the Static Stp Synchronous Random Position Cipher Encryption methodology.

FIG. 2D shows a diagram of R and the counting of the pseudo random numbers for matching each character in S used in the Static Stp Synchronous Random Position Cipher Encryption methodology.

Diagram 250 provides easier visualization and shows that R is made up of a series of pseudo random numbers [Stp (i.e. starting point), $S_1$, $S_2$, $S_3$, $S_4$, $S_5$, $S_6$, $S_7$, . . . ]. The number of pseudo random numbers for matching each character in S are shown as distances $d_1$ (between Stp and $S_1$), $d_2$ (between Stp and $S_2$), $d_3$ (between Stp and $S_3$), $d_4$ (between Stp and $S_4$), $d_5$ (between Stp and $S_5$), $d_6$ (between Stp and $S_6$), $d_7$ (between Stp and $S_7$), . . .

So, using the distance notations of R 250, S, R and C may be represented as:

$S=[S_1, S_2, S_3, S_4, S_5, S_6, S_7]$ $R=[\ldots, Stp, \ldots, S_1, \ldots, S_2, \ldots, S_3, \ldots, S_4, \ldots, S_5, \ldots, S_6, \ldots, S_7, \ldots]$ $C=[d_1, d_2, d_3, d_4, d_5, d_6, d_7]$ Starting point Stp in the pseudo-random sequence R can be any number selected from the pseudo-random sequence without having any specific characteristic, in order to act as the beginning digit of the encryption. Stp is very important as it ensures that without it no interceptor (e.g. a cyberpunk) can decrypt the ciphertext. Without even knowing the Stp, it makes it almost impossible for him to even start the decryption. Also, there is the flexibility every time to choose a different Stp;

Self-Synchronous RPC Decryption

To decrypt the ciphertext, the APRNG generates pseudo-random numbers up to the Stp (starting point):

$R=\{r_1, r_2, \ldots, r_{Stp}|r_{Stp+d1}, r_{Stp+d2}, \ldots, r_{Stp+dn}\}$

After the Stp, the decryption begins in the pseudo-random sequence R, measuring only the distances from Stp in the ciphertext:

$C=[d_1, d_2, \ldots, d_n]$

More specifically, the decryption methodology will produce $d_1$ pseudo-random numbers after the Stp, until it produces the first pseudo-random number $r_1$, which corresponds to the first ASCII code character $S_1$, and will continue for the remaining $r_i$ corresponding to the remaining $S_i$. All distance $d_i$ are measured from Stp.

Periodically Resetting Synchronous RPC Encryption

In a variation of the static Stp synchronous encryption, termed periodically resetting self-synchronous encryption, the Stp point is reset every constant Con (or every X character encryptions). In one aspect, constant period Con (or X) is set low (e.g. every 5 random numbers). The lower X, the lower the error and loss rate, so there is a compromise between the choice of Con (or X) and performance. After Con (or X steps), Stp is reset as follows:

Stp'=Stp+Con where Con is a constant number.

Figure 2E:
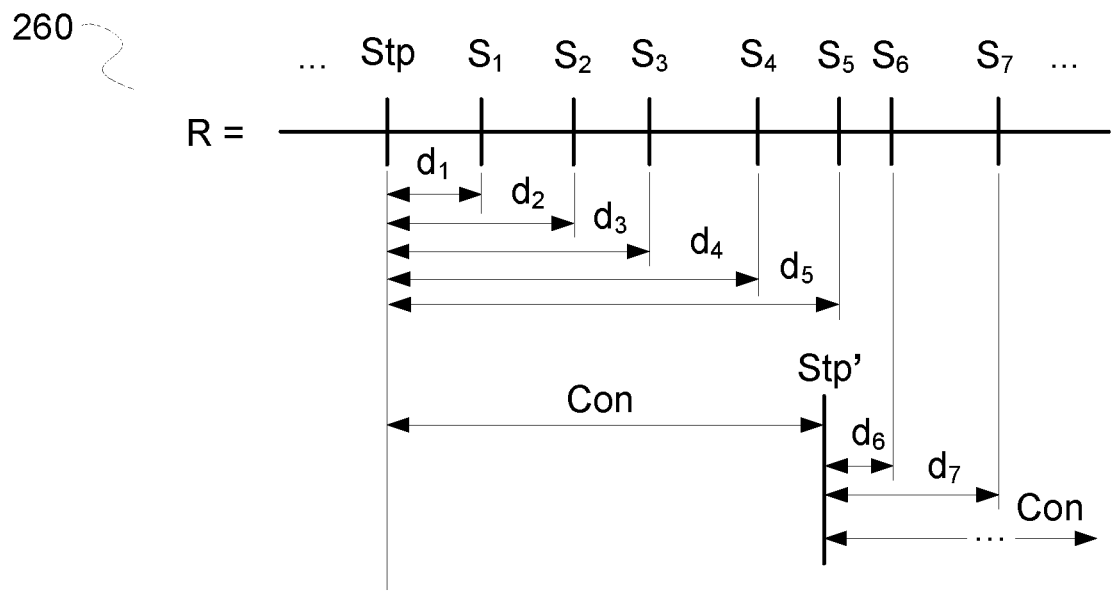
FIG. 2E shows a diagram of R and the counting of the pseudo random numbers for matching each character in S used in the Periodically Resetting Synchronous Random Position Cipher Encryption methodology.

FIG. 2E shows a diagram of R and the counting of the pseudo random numbers for matching each character in S used in the Periodically Resetting synchronous Random Position Cipher Encryption methodology.

The process for periodically resetting synchronous RPC Encryption is identical to the static Stp synchronous RPC Encryption shown in FIG. 2D except from the counting of the distances shown in FIG. 2D.

Diagram 260 provides easier visualization and shows that R is made up of a series of pseudo random numbers [Stp (i.e. starting point), $S_1$, $S_2$, $S_3$, $S_4$, $S_5$, $S_6$, $S_7$, . . . ]. The number of pseudo random numbers for matching each character in S are shown as distances $d_1$ (between Stp and $S_1$), $d_2$ (between Stp and $S_2$), $d_3$ (between Stp and $S_3$), $d_4$ (between Stp and $S_4$), $d_5$ (between Stp and $S_5$).

After calculation of distance $d_5$, Stp' is set to Stp+Con and distances $d_6$ (between Stp' and $S_6$), $d_7$ (between Stp' and $S_7$), . . . are calculated. Con is constant selected to create a small S', which results into significantly shorter distances $d_6$, $d_7$, compared to the calculating distances $d_6$, $d_1$, . . . using Stp. As a result, the prepresentation of distances $d_6$, $d_7$, . . . is done with smaller numbers (as opposed to using Stp) and the size of ciphertext C is not increased but by a very small amount, resulting in performance gains.

In one aspect Stp' is set to align with $d_5$, while in another aspect Stp' is not set to align with $d_5$. Stp" and so on are calculated similarly to Stp'.

So, using the distance notations of R 250, S, R and C may be represented as:

$S=[S_1, S_2, S_3, S_4, S_5, S_6, S_1]$ $R=[\ldots, Stp, \ldots, S_1, \ldots, S_2, \ldots, S_3, \ldots, S_4, \ldots, S_5, Stp', \ldots, S_6, \ldots, S_7, \ldots]$ $C [d_1, d_2, d_3, d_4, d_5, d_6,]$ Starting point Stp in the pseudo-random sequence R can be any number selected from the pseudo-random sequence without having any specific characteristic, in order to act as the beginning digit of the encryption. Stp is very important as it ensures that without it no interceptor (e.g. a cyberpunk) can decrypt the ciphertext. Without even knowing the Stp, it makes it almost impossible for him even to start the decryption. Also, there is the flexibility every time to choose a different Stp; Similarly, Stp' etc. are not known to interceptors making it almost impossible for then even to continue the decryption.

Periodically Resetting Self-Synchronous RPC Decryption

To decrypt the ciphertext, the APRNG generates pseudo-random numbers up to the Stp (starting point):

$R=\{r_1, r_2, \ldots, r_{Stp}|r_{Stp+d1}, r_{Stp+d2}, \ldots, r_{Stp+dX}\}$

After the Stp, the decryption begins in the pseudo-random sequence R, measuring only the distances from Stp in the ciphertext:

$C=[d_1, d_2, \ldots, d_X, \ldots]$

More specifically, the decryption methodology will produce $d_1$ pseudo-random numbers after the Stp, until it produces the first pseudo-random number $r_1$, which corresponds to the first ASCII code character $S_1$, and will continue for the remaining $r_i$ corresponding to the remaining $S_i$ until X (i.e. 5 in the present example) is reached. At this point Stp' is calculated and the decryption methodology continues with number $r_{X+1}$, which corresponds to the first ASCII code character $S_{X+1}$ and will continue for the remaining $r_i$ corresponding to the remaining $S_i$.

Randomly Resetting Synchronous RPC Encryption

In a variation of the static Stp and the periodically resetting synchronous encryption, termed randomly resetting synchronous encryption, the Stp point is reset every $R_i$ pseudo random number (or every $R_i$ character) encryptions. In one aspect period $R_i$ is set low. The lower $R_i$, the lower the error and loss rate, so there is a compromise between the choice of $R_i$ and performance. After $R_i$, Stp is reset as follows:

Stp'=Stp+$R_i$ where $R_i$ is a varying pseudo-random number produced by an APRNG module.

Figure 2F:
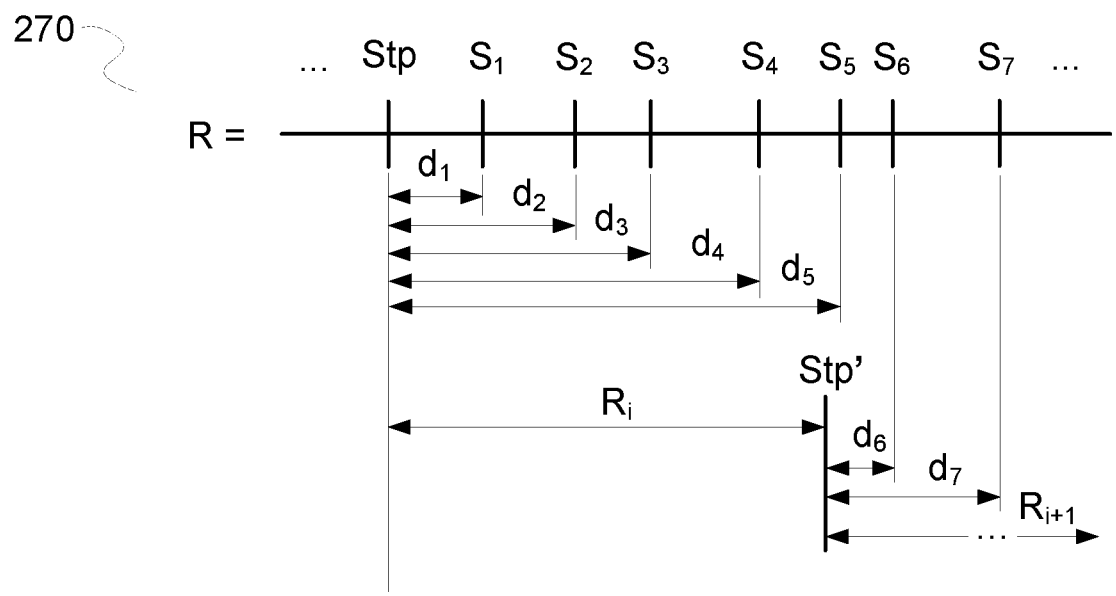
FIG. 2F shows a diagram of R and the counting of the pseudo random numbers for matching each character in S used in the Randomly Resetting Synchronous Random Position Cipher Encryption methodology.

FIG. 2F shows a diagram of R and the counting of the pseudo random numbers for matching each character in S used in the Randomly Resetting synchronous Random Position Cipher Encryption methodology.

The process for randomly resetting synchronous RPC Encryption is identical to the static Stp synchronous RPC Encryption shown in FIG. 2D, and the periodically resetting synchronous RPC encryption shown in FIG. 2E except from the counting of the distances shown in FIG. 2D and FIG. 2E.

Diagram 270 provides easier visualization and shows that R is made up of a series of pseudo random numbers [Stp (i.e. starting point), $S_1$, $S_2$, $S_3$, $S_4$, $S_5$, $S_6$, $S_7$, . . . ]. The number of pseudo random numbers for matching each character in S are shown as distances $d_1$ (between Stp and $S_1$), $d_2$ (between Stp and $S_2$), and $d_3$ (between Stp and $S_3$), $d_4$ (between Stp and $S_4$), $d_5$ (between Stp and $S_5$).

After $R_i$ and the calculation of distance $d_5$, Stp' is set to Stp+$R_i$ and distances $d_6$ (between Stp' and $S_6$), $d_7$ (between Stp' and $S_7$), . . . are calculated. $R_i$ is varying and is normalized to a small range for creating a small S', which results into significantly shorter distances $d_6$, $d_7$, compared to the calculating distances $d_6$, $d_7$, . . . using Stp. As a result, the presentation of distances $d_6$, $d_7$, . . . is done with smaller numbers (as opposed to using Stp) and the size of ciphertext C is not increased but by a very small amount, resulting in performance gains.

In one aspect Stp' is set to align with $d_5$, while in another aspect Stp' is not set to align with $d_5$. Stp" and so on are calculated similarly to Stp'.

So, using the distance notations of R 270, S, R and C may be represented as:

S=[$S_1$, $S_2$, $S_3$, $S_4$, $S_5$, $S_6$, $S_1$]
R=[ . . . , Stp, . . . $S_1$, . . . , $S_2$, . . . , $S_3$, . . . , $S_4$, . . . , $S_5$, Stp', . . . , $S_6$, . . . , $S_7$, . . . ]
C=[$d_1$,$d_2$, $d_3$, $d_4$, $d_5$, $d_6$, $d_7$]

Starting point Stp in the pseudo-random sequence $R_i$ can be any number selected from the pseudo-random sequence without having any specific characteristic, in order to act as the beginning digit of the encryption. Stp is very important as it ensures that without it no interceptor (e.g. a cyberpunk) can decrypt the ciphertext. Without even knowing the Stp, it makes it almost impossible for him even to start the decryption. Also, there is the flexibility every time to choose a different Stp; Similarly, Stp' etc. are not known to interceptors making it almost impossible for them even to continue the decryption.

Stp" is then set similarly to Stp' using a new $R_i$ produced by the APRNG. It is almost impossible for an interceptor to guestimate the pseudo-random numbers from the APRNG but a user in possession of the secret key can use the APRNG to produce the pseudo-random numbers used in the Randomly Resetting Synchronous RPC Encryption (as well as, in the Random Shifting Stp Self-Synchronous RPC Encryption).

Randomly Resetting Synchronous RPC Decryption

The Randomly Resetting Synchronous RPC Decryption is identical to the Periodically Resetting Synchronous RPC Decryption, with the only difference being the counting of distances $d_i$.

Implementing an RPC Encryption and Decryption Computing Apparatus

Figure 4:
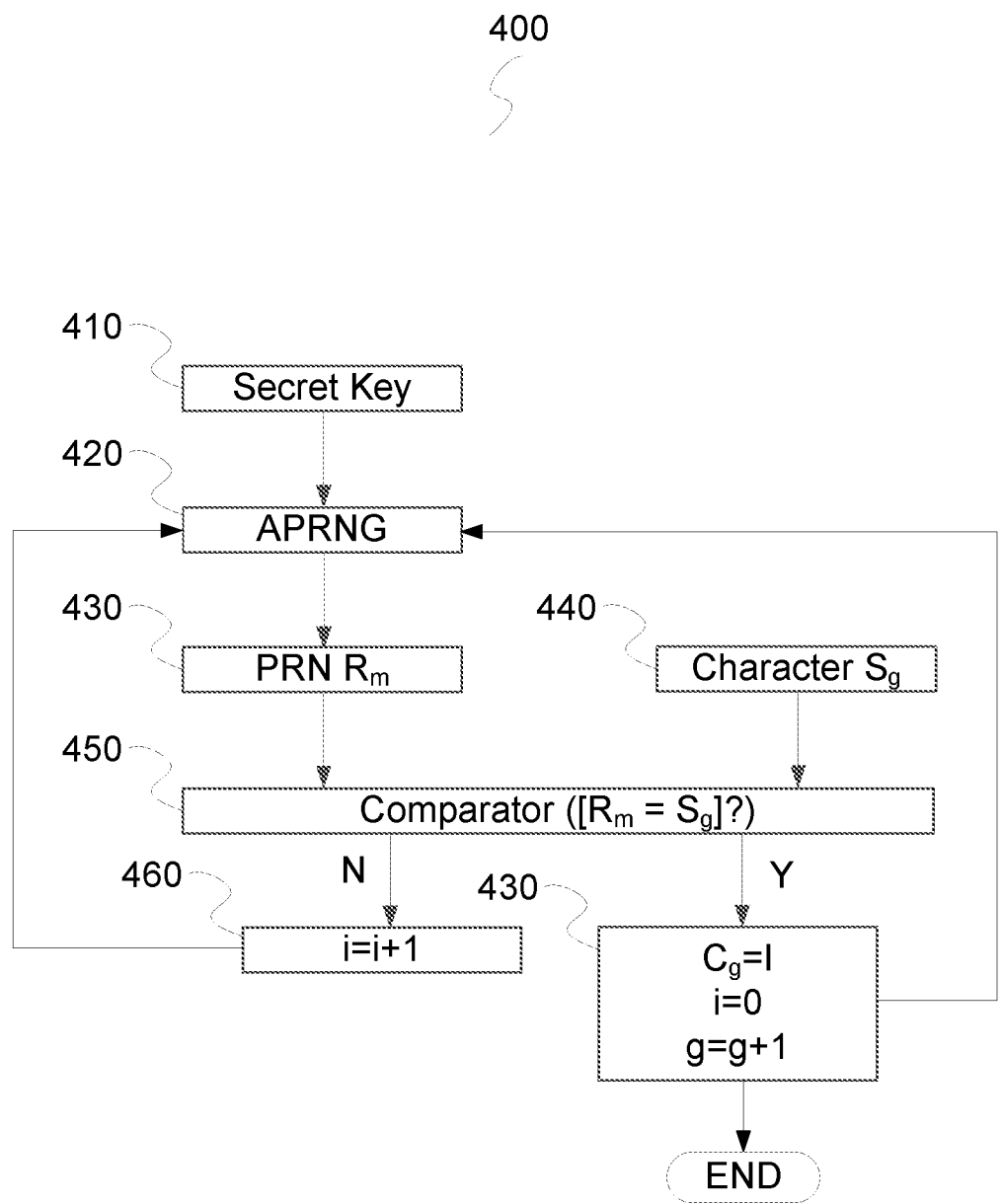
FIG. 4 shows an exemplary high-level block diagram of a Synchronous RPC Encryption Computing Apparatus.

FIG. 4 shows an exemplary high-level block diagram of a Synchronous RPC Encryption and Decryption Computing Apparatus. Computing apparatus 400 is made up of APRNG generator 420 which is fed with a secret key from secret key module 410. APRNG 420 produces pseudo random numbers 430, which are fed together with characters $S_g$ for plaintext reader module 440 to a comparator module 450. Until pseudo-random number 430 matches character $S_g$ 440, comparator module 450 increments a counter i in counter module 460 and feeds i to APRNG 420.

When pseudo-random number 430 matches character $S_g$, comparator module 450, outputs distance $d_i$ and saves it at a matrix D, sets i=e, and increments counter g=g+1 and branches back to APRNG 420.

Counter g is used for implementing the exemplary Synchronous RPC Encryption Computing Apparatus and the Periodically Resetting Self-synchronous RPC Encryption Computing Apparatus.

In a first aspect the modules of computing apparatus 400 are implemented as hardware modules, which in a second aspect they are implemented as software modules, and in a third aspect they are implemented as a combination of hardware and software modules. It is obvious to a person of ordinary skill in related art that some of the previously mentioned modules may be merged and other modules may be omitted or new modules added without departing from the scope of the present innovative solution.

The same computing apparatus 400 can be used for decryption where module 440 feeds the ciphertext C to comparator module 450, and comparator module 450 the ASCII code of the pseudo random numbers R corresponding to distances D and saves it, sets i=0, and increments counter g=g+1 and branches back to APRNG 420. The characters in R are ASCII codes, which are then converted into the corresponding unencrypted characters of S.

Detailed Hardware Implementation of an 8-Bit Comparator

Figure 5:
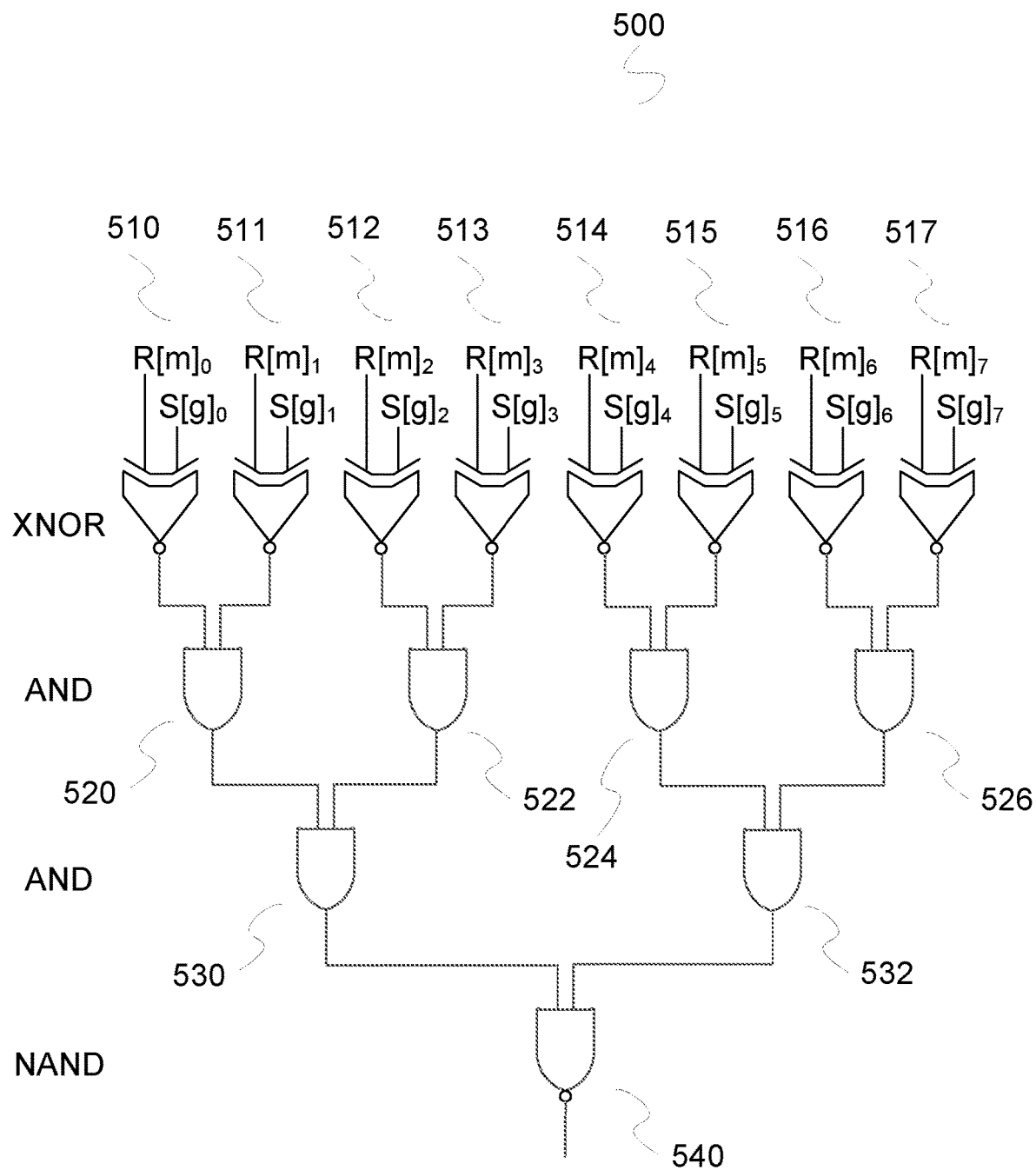
FIG. 5 shows a detailed hardware implementation of an 8-bit comparator module.

FIG. 5 shows a detailed hardware implementation of an 8-bit comparator module. Comparator module is made up of a series of Exclusive NOR Gates, 510, 511, 512, 513, 514, 515, 516, 517 each fed with a pseudo random number bit $R[m]_i$ and a plaintext bit $S[g]_i$, with i ranging from (0 . . . 7).

XNOR gates 510-517 are paired according to increasing bit positions, forming 4 pairs of XNOR gates (510, 511), (512, 513), (514, 515), (516, 517). The output of the two XNOR gates in each pair of XNOR gates (510, 511), (512, 513), (514, 515), (516, 517) is added using a first level of AND gates 520, 522, 524, 526, respectively. A second level of AND gates 530, 532 each adds the results a pair of first level AND gates (520, 522), (524, 526) where the first level gates are paired according to increasing bit positions. The results of the second level AND gates 530, 532 are fed to a NAND gate 540, which outputs the final result of the 8-bit comparator module 500.

The implementation of the logic gates are known to readers skilled in related art.

Verilog Code with Bitwise Operations for the Circuit in FIG. 5.

Figure 10:
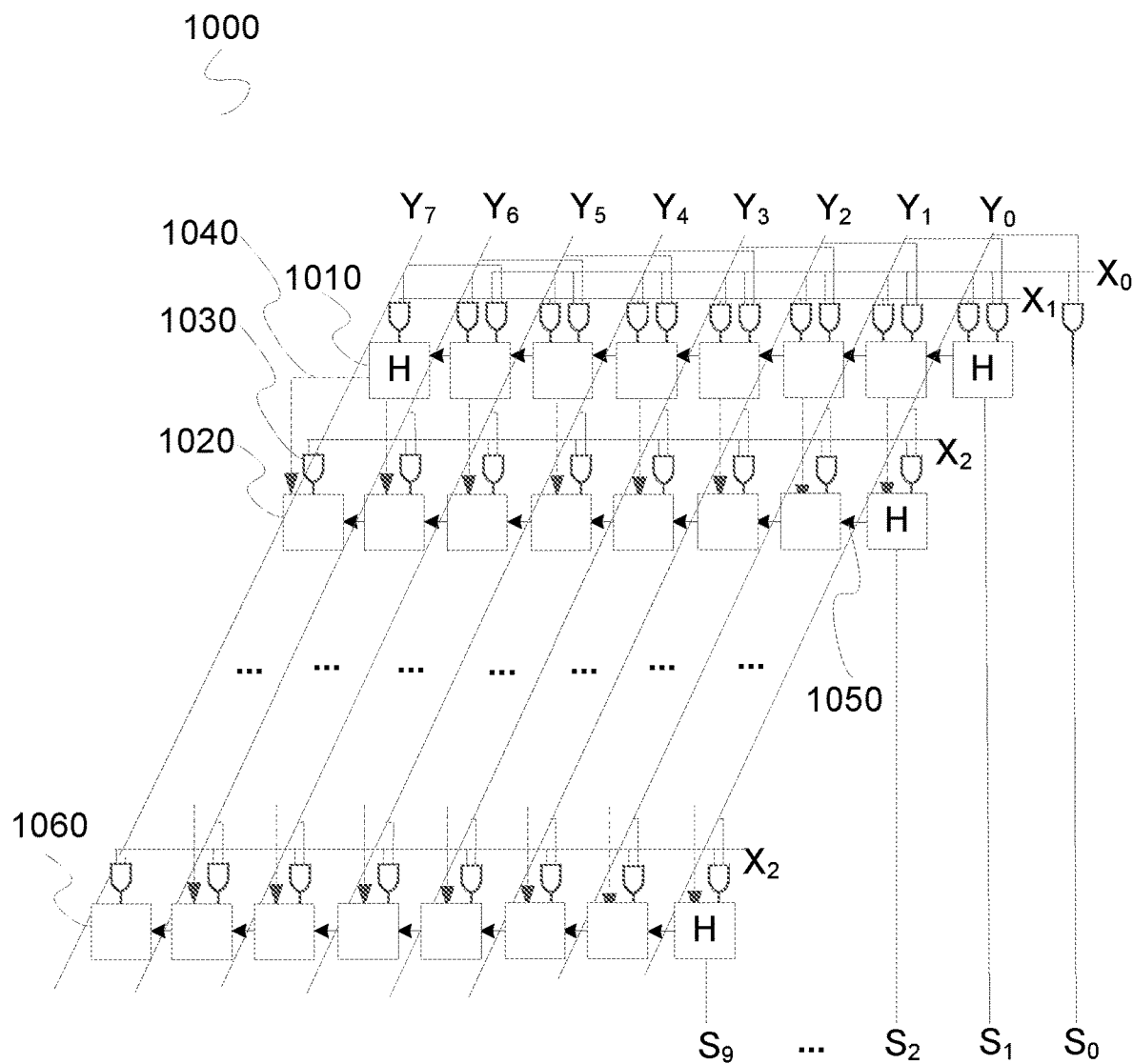
FIG. 10 shows a mid-level hardware implementation of an 8×8 multiplier circuit.

Below is an exemplary Verilog code with bitwise operations for the 8-bit comparator module circuit in FIG. 5.

module Comparator(input Rm, Sg output P); #FIG. 10 input [7:0] Rm;
input [7:0] Sg;
output [0:0] P;
wire w0=(Rm[0]⊙Sg[0]);
wire w1=(Rm[1]⊙Sg[1]);
wire w2=(Rm[2]⊙Sg[2]);
wire w3=(Rm[3]⊙Sg[3]);
wire w4=(Rm[4]⊙Sg[4]);
wire w5=(Rm[5]⊙Sg[5]);
wire w6=(Rm[6]⊙Sg[6]);
wire w7=(Rm[7]⊙Sg[7]);
wire w00=(w0& w1);
wire w11=(w2& w3);
wire w22=(w4& w5);
wire w33=(w6& w7);
wire w000=(w00& w11);
wire w111=(w22& w33);
wire P=(w000~& w111);
endmodule

APRNG

A Pseudo-Random Number Generator (PRNG) is a computer or mechanical device designed to produce a sequence of numbers or symbols that do not follow a pattern thus, they appear random. PRNGs operate with an initial seed that is used to kickstart the production of the pseudo-random numbers.

RNGs are routinely used in lucky games, online casinos, sampling for statistics, simulations, cryptography, completely random design, and other areas where the production of an unpredictable result is desirable. In general, where unpredictable numbers are of the utmost importance—as in security applications—mechanical generators are preferred (where possible) over pseudo-random algorithms. Also, random number generators are very useful in Monte Carlo algorithms and simulations, because the debugging is facilitated by the ability of generators to produce the same sequence of random numbers in many runs of the same application. RNGs are also used in cryptography where the seed is kept secret so as to prevent hackers from calculating the next numbers in the sequence of pseudo-random numbers produced by the generator.

There are several random number generators with different behaviors in the randomness of their outputs, such as the MERSEN TWISTER, XORSHIFT128, XOROSHIRI128+, etc. In practice, these generators may fail several evaluation tests due to the following disadvantages:

they limit the potential seeds (i.e. initial conditions) that can be used for not limiting the expected periods of the generated pseudo-random numbers. The non-allowable seeds (termed "weak" seeds) limit the pool of seeds that can be used, rendering the generators weaker for cryptographic applications, as hackers can correctly guess the random numbers faster, i.e. make it practical using available processing power. Similarly, if a weak seed is used, the period of the generated pseudo-random number sequence is shortened, effectively limiting the random nature of the generated sequence.

Lack of uniformity of the distribution of the produced numbers. This may result in the biased pseudo-random numbers in the sequence and, consequently, affect the applications where these numbers will be used.

Relationship between successive numbers of the sequence. "Poor" dimensional distribution of the numbers produced in the sequence. Similar to lack of uniformity, the relationship between successive numbers in the sequence can bias the sequence and, consequently, affect the applications where these numbers will be used.

The distances between specific values that are displayed are distributed differently from the corresponding distances in a truly random sequence of random numbers. Again, this difference causes biases.

Possible random sequences are limited, because the number of the random seeds are also limited. This has negative effects to the applications using the generated Pseudo Random Numbers (PRN).

Not cryptographically secure as the attacker can successfully predict the next random number by analyzing a sample of random numbers in the sequence.

Many of the known PRNG implementations have additional limitations, like requiring heavy processing for the production of the PRN sequences. Such a limitation is very significant as the length of the seed and/or the generated numbers is increased (e.g. dozens of digits-long in prior art, or hundreds or thousands of digits long in the present innovative PRNG). It may not sound very limiting but there are many situations where the processing power and/or the local storage is scarce and expensive such as in portable devices, credit cards, Internet-Of-Things (IOT) devices, etc. but also in servers handling huge numbers of requests for pseudo random numbers as in banking environments, etc.

The present innovative APRNG creates pseudo random numbers with practically infinite (i.e. very long—several thousand numbers) period and with hundreds or thousands of digits. Such a long period for the PRN sequence ensures that the sequence of numbers produced is not repeated in practice (i.e. the period is very long, in the order of thousands of pseudo-random numbers. Another feature is the efficiency of the APRNG, in the sense that it should be fast to run and not use a lot of computing resources (i.e. processing power and memory). Another useful feature of the APRNG is the ability to reproduce the exact same sequence of numbers as many times as we want. This feature, commonly referred to as repeatability, is very useful in debugging, controlling and comparing programs (i.e. for the same seed the PRNG will produce the same PRN sequence). The APRNG is also portable, that is, works exactly the same way and have exactly the same results in different computing environments.

Exemplary Embodiment of the APRNG

Figure 6A:
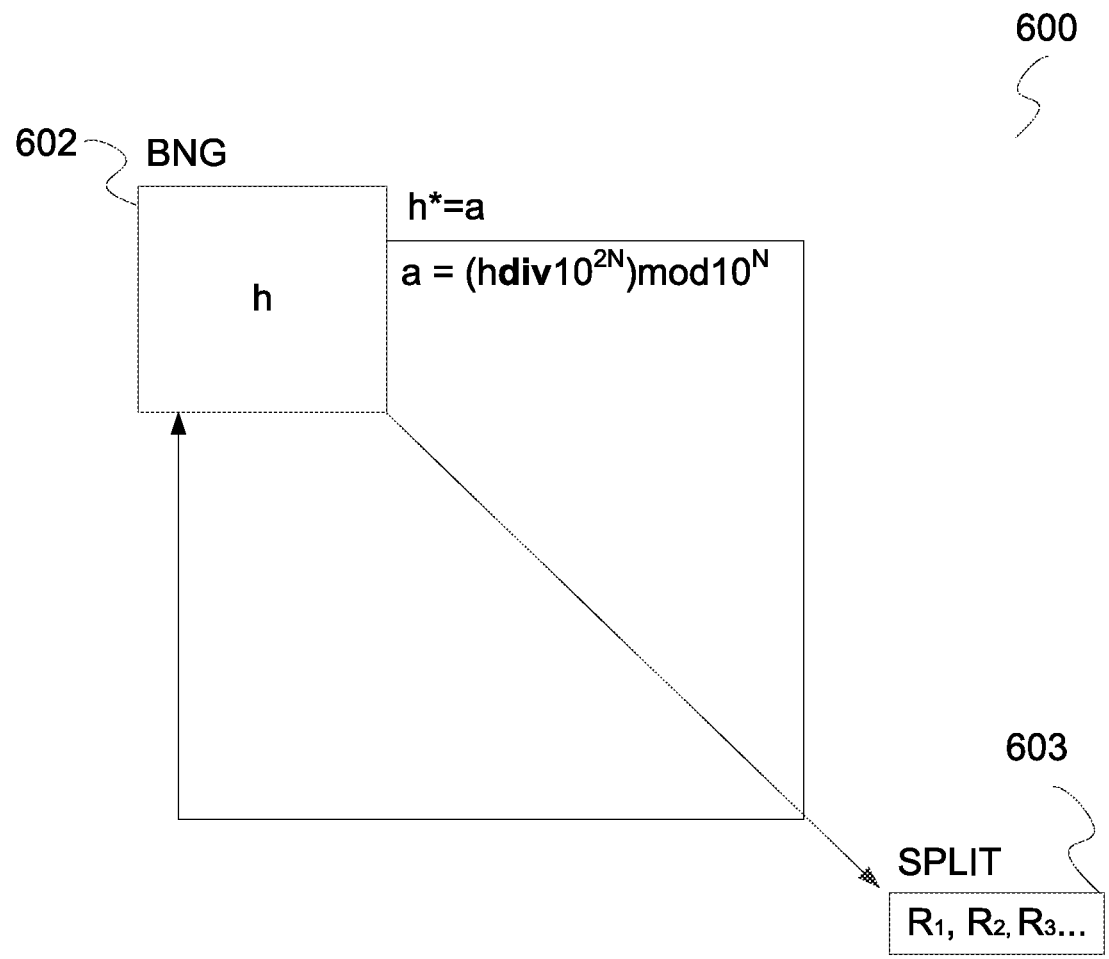
FIG. 6A shows an Exemplary Embodiment of an APRNG.

FIG. 6A shows an Exemplary Embodiment of an APRNG. Referring to the exemplary embodiment 600 of FIG. 6A, APRNG 601 uses a Big Number Generator (BNG) 602 which can generate a large random number h that is used to seed the APRNG. The large random number h can be generated, for example, by taking three separate readings (a, b, c) of the computer clock and multiplying the three numbers (a, b, c) to arrive at h=a*b*c.

Alternatively, the values of a, b, c can be concatenated to obtain h=(ab). The values of a, b, c can also be obtained from any automated process or source (e.g. a computer clock or other). The value of a, b, and c can be selected to be any number of 7 or more digits (e.g., 100 digits).

In this embodiment, the BNG shown in FIG. 6A generates large random numbers $h_0$-$h_n$ utilizing the following scheme.

$$h_0 = a*b*c$$

$h_1 = h_0 * a'$, where $a' = (h_0 \text{ div } 10^{2N}) \bmod 10^N$, and $N$=number of digits in $a$ $h_2 = h_1 * a''$, where $a'' = (h_1 \text{ div } 10^{2N}) \bmod 10^N$, and $N$=number of digits in $a'$ $h_n = h_{n-1} * a_k$, where $a_k = (h_{n-1} \text{ div } 10^{2N}) \text{mod } 10^N$, and
N=number of digits in $a_{k-1}$   Equation (1)

Each large random number $h_n$ that is generated is used in the subsequent iteration to generate the subsequent large random number $h_{n+1}$. Specifically, the initial large random number, $h_0$, is generated by multiplying a, b, and c. The next large random number, $h_1$, is generated by multiplying the previous large random number $h_0$ by a', which is obtained by the formula: $a' = (h_0 \text{ div } 10^{2N}) \text{ mod } 10^N$, where N is the number of digits in a. The next large random number, $h_2$, is generated by multiplying the previous large random number $h_1$ by a", which is obtained by $a'' = (h_1 \text{ div } 10^{2N}) \text{ mod } 10^N$, where N is the number of digits in a'. This process is repeated until the desired number of random numbers is obtained.

Each large random number $h_n$ that is generated (i.e. $h_0, h_1, h_2, \ldots, h_n$) can be split 603 into smaller groups of random numbers (i.e. $r_1, r_2, r_3 \ldots r_n$), in the same manner discussed above in connection with the 1$^{st}$ exemplary embodiment, and used directly for the application or purpose for which the output was generated.

Alternatively, a' can be generated by selecting digits from various positions of $h_{n-1}$, or by aggregating various groupings in $r_{1-m}$, such as, the values in the first position ($r_1$), last position ($r_k$), middle position ($r_{middle}$), etc. These groupings of random numbers can then be concatenated thereby creating the subsequent a'.

This embodiment of the APRNG is aperiodic as the number $h_n$ increases towards infinity.

The pseudo-random numbers $r_1$ produced by the APRNG module can then be "normalized" to (0 . . . 255) in a subsequent operation or automatically before outputted by the APRNS. This normalization-like operation is explained below.

Methodology of the Operation of the APRNG

The APRNG may be implemented in software, hardware, firmware or a combination of the previous. Considering an example hardware architecture, a micro-chip implements long multiplication (i.e. the "vertical" multiplication of two numbers using partial multiplication results of a first number with each digit of a second number, and adding the partial results—each partial result is misaligned with respect to the partial result above it by a 1-digit position—to derive the final multiplication result) in hardware and/or in software for various integer and floating-point word (i.e. number) sizes. In arbitrary-precision arithmetic, the exemplary micro-chip uses long multiplication with the base set to $2^w$, where w is the number of bits in a word, for multiplying relatively small numbers.

To multiply two numbers h (with n digits) and a (with N digits) to produce subsequently the next h (with n+N−1 up to n+N digits) using the long multiplication method in the exemplary embodiments above, the micro-chip implementing the APRNG needs about (n*N)+z operations for the next subsequent result number h (z is for adding the partial results) plus n+N−1 steps for splitting the number h to groups of one digit. So, the general time complexity is:

$O(n*N+n+N-1)$ up to $O(n*N+n+N)$

Therefore, the time complexity until the microchip produces the first random number is $O(n*N+n+N-1+(i-1))$ up to $O(n*N+n+N+(i-1))$ where i denotes the iteration and starts from the value of "1".

The goal is to minimize the time complexity of the calculations in the above exemplary embodiments from $O(n*N+n+N+(i-1))$ to $O(1)$ for each random number.

Figure 6B:
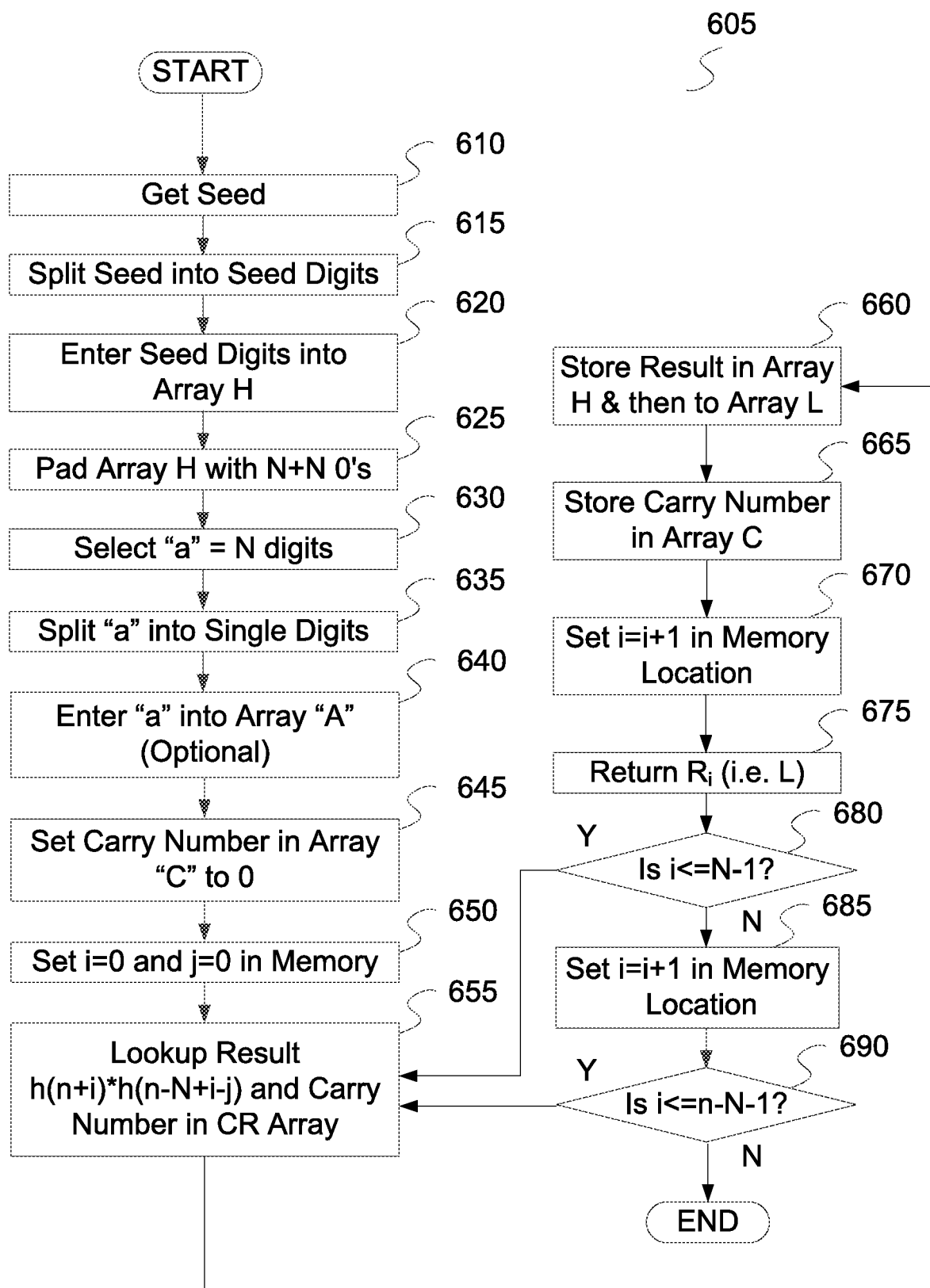
FIG. 6B shows a flowchart of a methodology for creating a pseudo random number with the present APRNG.

1$^{st}$ Simplification for the Reduction of the APRNG Complexity in Calculations:

FIG. 6B shows a flowchart of a methodology for creating a pseudo random number with the present APRNG.

We assume the following example, where:

$h = 803{,}729{,}152$ $a = 729$

Initially, in methodology 605, a first huge seed number h is selected 610, split into single digits 615, and stored in an array 620 with length equal to n=length(h), as shown in the example below. For simplicity in the illustration, h is shown to have only 9 digits:

$h = $ | 8 | 0 | 3 | 7 | 2 | 9 | 1 | 5 | 2 |

The number a in this example has length N=3 digits, so in array h we will add [N]=3 zero cells at the end and [N]=3 zero cells at the beginning 625, as follows:

$h = $ | 0 | 0 | 0 | 8 | 0 | 3 | 7 | 2 | 9 | 1 | 5 | 2 | 0 | 0 | 0 |

The 3rd zero cell at the end of h is used in the manipulation of tables (refer to the paragraph "Implementing the Tables").

a is then selected 630, split into single digits 635 and optionally entered into an array A 640.

And now we can computationally shorten operations to local places by making the algorithm more efficient at speed, performing for each one-digit random number and its corresponding multiplications, a total number of operations reduced to O (1) time complexity. A carry bit c is set to 0 in an array C 645 and a set of counters i,j are set to 0 in memory 650.

The multiplications between the padded h and the number a are calculated as shown in Table 1. In practice the multiplications in Table 1 are implemented as a series of lookup operations for the result and the associated carry number in a table that holds all the possible results and carry numbers (this is explained in detail later in the description where the use of arrays is presented).

TABLE 1

Multiplication of h * a

Multiplication 0 0 0 8 0 3 7 2 9 1 5 2 0 0 0
                                7 2 9 = 14 + 0 + 0 + 0 = 14
                          7 2 9 = 35 + 4 + 0 + 1 = 40
                      7 2 9 = 7 + 10 + 18 + 4 = 39
                 7 2 9 = 63 + 2 + 45 + 3 = 113
              7 2 9 = 14 + 18 + 9 + 11 = 52
           7 2 9 = 49 + 4 + 81 + 5 = 139
        7 2 9 = 21 + 14 + 18 + 13 = 66
      7 2 9 = 0 + 6 + 63 + 6 = 75
   7 2 9 = 56 + 0 + 27 + 7 = 90
 7 2 9 = 0 + 16 + 0 + 9 = 25
7 2 9 = 0 + 0 + 72 + 2 = 74
7 2 9 = 0 + 0 + 0 + 7 = 7

The random sequence of single digits that are extracted are: R={4, 0, 9, 3, 2, 9, 6, 5, 0, 5, 4, 7} which we can group according to our choice, e.g.: in two-digit random numbers: R={40, 93, 29, 65, 5, 47}, or three-digit random numbers: R={409, 329, 650, 547}, etc.

Taking a closer look to how R is produced, we start by taking as the initial seed a large number $h_0$ and enter it in a table 1xn, that is, we break $h_0$ in its digits and fill the cells of the table with its digits, as in the example:

$h =$ | 8 | 0 | 3 | 7 | 2 | 9 | 1 | 5 | 2 |

Then we use the length N of the number a to choose from $h[N]$ up to $h[2*N-1]$ cell of array h, but based on the above example, for more efficient speed, we will place N zero cells at the beginning of array h and N zero cells in end of array h. So the new cell sorting will be from $h[2*N]$ up to $h[3*N-1]$ based on the new extension of array h:

$h =$ | 0 | 0 | 0 | 8 | 0 | 3 | 7 | 2 | 9 | 1 | 5 | 2 | 0 | 0 | 0 |

Then the algorithmic operations and steps (from FIG. 6B) to produce the random numbers R1, R2, . . . are:

$C_0 = 0$ $R_1 = (h[6]*h[-3]+h[7]*h[-2]+h[8]*h[-1]+C_0) \bmod 10$ $C_1 = R_1 // 10$ $R_2 = (h[6]*h[-4]+h[7]*h[-3]+h[8]*h[-2]+C_1) \bmod 10$ $C_2 = R_2 // 10$ $R_3 = (h[6]*h[-5]+h[7]*h[-4]+h[8]*h[-3]+C_2) \bmod 10$ $C_3 = R_3 // 10$ $R_4 = (h[6]*h[-6]+h[7]*h[-5]+h[8]*h[-4]+C_3) \bmod 10$ $C_4 = R_4 // 10$ $R_5 = (h[6]*h[-7]+h[7]*h[-6]+h[8]*h[-5]+C_4) \bmod 10$ $C_5 = R_5 // 10$ $R_6 = (h[6]*h[-8]+h[7]*h[-7]+h[8]*h[-6]+C_4) \bmod 10$ $C_6 = R_6 // 10$ $R_7 = (h[6]*h[-9]+h[7]*h[-8]+h[8]*h[-7]+C_6) \bmod 10$ $C_7 = R_7 // 10$ $R_8 = (h[6]*h[-10]+h[7]*h[-9]+h[8]*h[-8]+C_7) \bmod 10$ $C_8 = R_8 // 10$ $R_9 = (h[6]*h[-11]+h[7]*h[-10]+h[8]*h[-9]+C_8) \bmod 10$ $C_9 = R_9 // 10$ $R_{10} = (h[6]*h[-12]+h[7]*h[-11]+h[8]*h[-10]+C_9) \bmod 10$ $C_{10} = R_{10} // 10$ $R_{11} = (h[6]*h[-13]+h[7]*h[-12]+h[8]*h[-11]+C_{10}) \bmod 10$ $C_{11} = R_{11} // 10$ $R_{12} = (h[6]*h[-14]+h[7]*h[-13]+h[8]*h[-12]+C_{11}) \bmod 10$ where:
$R_i = i^{th}$ Random number
$h[i]$ = Specific cell in the array h, with one-digit integer
$C_0$ = Seed
$C_{i-1}$ = Carry from previous step operation.
$R_i = h[2*N]*h[-i-N+1]+h[2*N+1]*h[-i-N+2]+ \ldots +h[3*N-1]*h[-i]+C_{i-1}$
// is the div operator The resulting pseudo random numbers are then stored 660 and so is the carry number 665. The i counter is increased by 1 between each iteration 670 and the result is returned 675 until i<=N-1 680 or the counter is increased by 1 685 until i<=n-N-1 690 and the result is calculated simply by a look up operation at a table holding all the possible results and carry numbers 655.

2nd Simplification for the Reduction of the APRNG Complexity in Calculations:

We can perform the operations of multiplication from the 1st simplification example, using the Multiplication Table (M) shown in Table 2:

TABLE 2

Multiplication Table (M) for decimal, single digit numbers.

| M | 0 | 1 | 2 | 3 | 4 | 5 | 6 | 7 | 8 | 9 |
|---|---|---|---|---|---|---|---|---|---|---|
| 0 | 0 | 0 | 0 | 0 | 0 | 0 | 0 | 0 | 0 | 0 |
| 1 | 0 | 1 | 2 | 3 | 4 | 5 | 6 | 7 | 8 | 9 |
| 2 | 0 | 2 | 4 | 6 | 8 | 10 | 12 | 14 | 16 | 18 |
| 3 | 0 | 3 | 6 | 9 | 12 | 15 | 18 | 21 | 24 | 27 |
| 4 | 0 | 4 | 8 | 12 | 16 | 20 | 24 | 28 | 32 | 36 |
| 5 | 0 | 5 | 10 | 15 | 20 | 25 | 30 | 35 | 40 | 45 |
| 6 | 0 | 6 | 12 | 18 | 24 | 30 | 36 | 42 | 48 | 54 |
| 7 | 0 | 7 | 14 | 21 | 28 | 35 | 42 | 49 | 56 | 63 |
| 8 | 0 | 8 | 16 | 24 | 32 | 40 | 48 | 56 | 64 | 72 |
| 9 | 0 | 9 | 18 | 27 | 36 | 45 | 54 | 63 | 72 | 81 |

For example, if we want to multiply 7×9, we don't need to calculate the multiplication operation. Instead, we can simply look up the value stored in the cell indexed by the 7th row and 9th column in the multiplication table M:

$M[7,9] = 63$

Then the more efficient algorithmic operations and steps from the previous $1^{st}$ simplification example to produce the random numbers $R_1, R_2, \ldots$ using table M are:

$C_0 = 0$ $R_1 = (M[h[6],h[-3]] + M[h[7],h[-2]] + M[h[8],h[-1]] + C_0) \bmod 10$ $C_1 = R_1 // 10$ $R_2 = (M[h[6],h[-4]] + M[h[7],h[-3]] + M[h[8],h[-2]] + C_1) \bmod 10$ $C_2 = R_2 // 10$ $R_3 = (M[h[6],h[-5]] + M[h[7],h[-4]] + M[h[8],h[-3]] + C_2) \bmod 10$ $C_3 = R_3 // 10$ $R_4 = (M[h[6],h[-6]] + M[h[7],h[-5]] + M[h[8],h[-4]] + C_3) \bmod 10$ $C_4 = R_4 // 10$ $R_5 = (M[h[6],h[-7]] + M[h[7],h[-6]] + M[h[8],h[5]] + C_4) \bmod 10$ $C_5 = R_5 // 10$ $R_6 = (M[h[6],h[-8]] + M[h[7],h[-7]] + M[h[8],h[-6]] + C_5) \bmod 10$ $C_6 = R_6 // 10$ $R_7 = (M[h[6],h[-9]] + M[h[7],h[-8]] + M[h[8],h[-7]] + C_6) \bmod 10$ $C_7 = R_7 // 10$ $R_8 = (M[h[6],h[-10]] + M[h[7],h[-9]] + M[h[8],h[-8]] + C_7) \bmod 10$ $C_8 = R_8 // 10$ $R_9 = (M[h[6],h[-11]] + M[h[7],h[-10]] + M[h[8],h[-9]] + C_8) \bmod 10$ $C_9 = R_9 // 10$ $R_{10} = (M[h[6],h[-12]] + M[h[7],h[-11]] + M[h[8],h[-10]] + C_9) \bmod 10$ $C_{10} = R_{10} // 10$ $R_{11} = (M[h[6],h[-13]] + M[h[7],h[-12]] + M[h[8],h[-11]] + C_{10}) \bmod 10$ $C_{11} = R_{11} // 10$ $R_{12} = (M[h[6],h[-14]] + M[h[7],h[-13]] + M[h[8],h[-12]] + C_{11}) \bmod 10$ where:

$C_{i-1} = R_{i-1} // 10$ $R_i = (M[h[2*N],h[-i-N+1]] + M[h[2*N+1],h[i-N+2]] + \ldots + M[h[3*N-1],h[-1]] + C_{i-1}) \bmod 10$ // is the div operator Then we can also build a two-dimensional CR board with all possible C, carry values, and random R numbers, so that we have direct access to the separate values without calculating them with mod and div operations. In the present example, the table will have as many cells as the formula:

$N*9*9+25 => N*81+24$ where:

9*9=81 is the largest number length used in the multiplication

N=Length (a)=3 based on the example above in Table 1.

24=the number of possible carries from the previous multiplication is 1 . . . 24

Therefore, for N=3 => 3*81+24=267 cells:

TABLE 3

Table (CR) holding all possible carry (C) and single digit decimal numbers (R).

| CR | 0 | 1 | 2 | 3 | 4 | 5 | 6 | 7 | 8 | 9 | 10 | 11 | 12 | ... | 264 | 265 | 266 | 267 |
|---|---|---|---|---|---|---|---|---|---|---|---|---|---|---|---|---|---|---|
| 0 | 0 | 0 | 0 | 0 | 0 | 0 | 0 | 0 | 0 | 0 | 1 | 1 | 1 | ... | 26 | 26 | 26 | 26 |
| 1 | 0 | 1 | 2 | 3 | 4 | 5 | 6 | 7 | 8 | 9 | 0 | 1 | 2 | ... | 4 | 5 | 6 | 7 |

The CR table can be extended for the maximum number of 7 digits for a, thus creating a CR table of length: 7*81+56=623 cells. In one aspect, the exemplary embodiment always uses the extended CR table regardless of the length of a. This way the CR table is created once and used for all lengths of a.

The first line of the CR Table refers to carry values (C) and the second line refers to RNG values (R).

So, by simplifying and replacing the previous mod and div operations with the values from the CR table, we have:

$C_0 = 0$ $R_1 = CR[1, (M[h[6],h[-3]] + M[h[7],h[-2]] + M[h[8],h[-1]] + C_0) = r_1]$ $c_1 = CR[0, r_1]$ $R_2 = CR[1, (M[h[6],h[-4]] + M[h[7],h[-3]] + M[h[8],h[-2]] + C_1) = r_2]$ $C_2 = CR[0, r_2]$ $R_3 = CR[1, (M[h[6],h[-5]] + M[h[7],h[-4]] + M[h[8],h[-3]] + C_2) = r_3]$ $C_3 = CR[0, r_3]$ $R_4 = CR[1, (M[h[6],h[-6]] + M[h[7],h[-5]] + M[h[8],h[-4]] + C_3) = r_4]$ $C_4 = CR[0, r_4]$ $R_5 = CR[1, (M[h[6],h[-7]] + M[h[7],h[-6]] + M[h[8],h[-5]] + C_4) = r_6]$ $C_5 = CR[0, r_6]$ $R_6 = CR[1, (M[h[6],h[-8]] + M[h[7],h[-7]] + M[h[\mathbf{8}],h[-6]] + C_5) = r_6]$ $c_6 = CR[0, r_6]$ $R_7 = CR[1, (M[h[6],h[-9]] + M[h[7],h[-8]] + M[h[8],h[-7]] + C_6) = r_7]$ $C_7 = CR[0, r_7]$ $R_8 = CR[1, (M[h[6],h[-10]] + M[h[7],h[-9]] + M[h[8],h[-8]] + C_7) = r_8]$ $C_8 = CR[0, r_8]$ $R_9=CR[0,(M[h[6],h[-11]]+M[h[7],h[-10]]+M[h[8],h[-9]]+C_8=r_9]$ $C_9=CR[0,r_9]$ $R_{10}=CR[1,(M[h[6],h[-12]]+M[h[7],h[-11]]+M[h[8],h[-10]]+C_6)=r_{10}]$ $C_{10}=CR[0,r_{10}]$ $R_{11}=CR[1,(M[h[6],h[-13]]+M[h[7],h[-12]]+M[h[8],h[-11]]+C_{10})=r_{11}]$ $C_{11}=CR[0,r_{11}]$ $R_{12}=CR[1,(M[h[6],h[-14]]+M[h[7],h[-13]]+M[h[8],h[-12]]+C_{11})=r_{12}]$ where:

$C_{i-1}=CR[0, r_{i-1}]$
$R_i=CR[1, (M[h[2*N],h[-i-N+1]]+M[h[2*N+1],h[-i-N+2]]+ \ldots +M[h[3*N-1],h[-i]]+C_{i-1}=r_i]$ $r_i$=the index of a column of the CR table Therefore, all that is needed to generate the PRN in the present example is to look up the carry numbers in the first line of the CR table and the PRN numbers in the second row of the CR table.

As a result the above solution has achieved to replace all multiplications, div and mod operators which are computationally intensive, with the much simpler operations of looking up separate values in a table and adding these values to each other, effectively reducing the order of complexity in the generation of the PRNs and allowing the PRNs to be computed faster even on processors with low processing power and available memory.

In a modification of the present exemplary embodiment, the 2-dimensional CR array is replaced by 2 one-dimensional arrays. The first such array, C, holds the carry values c and the second array, R holds the pseudo random number values, R.

Repeating the above simplification operations, one can produce a sequence of pseudo random numbers as shown in Table 4, repeatedly creating multiplications like in Table 1.

Table 5 illustrated in FIG. 16 shows how the multiplications of Table 4 can be simplified using CR result tables like in Table 3 for producing a sequence of pseudo random numbers. The process starts with the selection of a seed $h_0$=0 610, splitting it into single digits 615, and storing it in a table H 620 and then padding it with 0's 625. A number a is chosen 630 by the user or by an automated process (e.g. from the computer clock), split into single digits 635, and (optionally) entered into an array A 640. A table M is created containing all the multiplication results of all decimal single-digit numbers [1 . . . 9]. H and a are used together with M to create the CR table holding all possible random numbers $R_i$ and all possible carry numbers c for the R. The first carry number is set to "0" 645. To create a pseudo random number $R_1$, all that is needed is to use a seed $h_0$ (after the first iteration the previous h, $h_{i-1}$, becomes the seed) and stored in array H, and look it up at the CR table 655 (with the help of counters i, j [steps 650-690] that are initially set to 0). For each random number $R_i$ its digits are each calculated (i.e. the digits of the $h_i$ produced by the lookup operation at the CR table) and stored in array H 660 from the end to the beginning as they are computed. The carry bit $c_i$ is stored in array C 665. Having filled array H with an $h_i$, each digit in H is copied to an array L 660 in their correct order to form the pseudo random number $R_i$ which is returned for use 675. The pseudo random numbers are then used in any application needing random numbers and (optionally) used to seed to APRN to calculate new random numbers. In one aspect the pseudo random numbers are stored in a 2D array holding a sequence of pseudo random numbers, e.g. for testing or other operations.

Table 4 illustrated in FIG. 15 shows the multiplications. needed for the creation of a sequence of random numbers with the APRNG. "Mul." stands for "Multiplications" and "T." for "Table".

Table 5 illustrated in FIG. 16 shows the simplification of the multiplications needed for the creation of a sequence of random numbers with the APRNG. "T." stands for "Table".

Implementing the Tables

To implement the above process of RNG calculation we need to create 5 arrays:

CR (2×623 max), in which all possible C carry numbers are stored in the first line of CR array and all R random numbers in the second line, so that we have direct access without performing the mod and div operations. Smaller CR tables can be used for smaller a (refer to Table 3)

M (10×10), in which all possible results from one-to-one multiplications are stored, so that we have direct access to the results, without execution (refer to Table 2)

A (1×N), in which the digits of a are stored. A is optional as a is a part of h (refer to Table 1)

H (1×N), in which the calculated digits (triplet) of the number h (multiplied with the N=3 digits of a) will be stored from the end to the beginning with a time delay, after each of the mathematical operations (multiplication of each row) based on (Table 1)

L (1×N) (i.e. 3-7, 3 in the present example) in which the calculated digits of the number h will be stored after its mathematical operations (refer to Table 1)

C (1×1), in which single-cell array, the carry bit $c_i$ is stored.

Algorithmic Implementation of the calculations of Table 1

First, we take the number $h_0$ as a seed and separate it into its individual digits, which we store in an array H. Then we increase array H to the left and right with N zero cells, i.e. as many as the digits of the multiplier a (a is part of the number-array H). Subsequently:

for i=1 and U[0]=C0=0 we perform the operation:

$r_1=(h[6]*h[-4] +h[7]*h[-3] +h[8]*h[-2]+U[0])$ $R_1=r_1$mod10 for the pseudo-random number and $C_1=r_1$ div10 for the carry.

Then we assign the cell L[−imod3]=L[−1mod3]=L[−1] to h[−i]=h[−1] and $R_1$ is assigned to cell L[−1] and $C_1$ is assigned to cell U[0].

for i=2 we perform the operation:

$r_2=(h[6]*h[-5] +h[7]*h[-4] +h[8]*h[-3]+U[0])$ $R_2=r_2$mod10 for the pseudo-random number και $C_2=r_2$ div10 for the carry.

Then we assign the cell L[−imod3]=L[−2mod3]=L[−2] to h[−i]=h[−2] and $R_2$ is assigned to cell L[−2] and $C_2$ is assigned to cell U[0].

for i=3 we perform the operation:

$r_3=(h[6]*h[-6]+h[7]*h[-5]+h[8]*h[-4]+U[0])$ $R_3=r_3$mod10 for the pseudo-random number και $C_3=r_3$ div10 for the carry.

Then we assign the cell L[−imod3]=L[−3mod3]=L[0] to h[−i]=h[−3] and $R_3$ is assigned to cell L[0] and $C_3$ is assigned to cell U[0].

for i=4 we perform the operation:

$$r_4 = (h[6]*h[-7] + h[7]*h[-6] + h[8]*h[-5] + U[0])$$

$R_4 = r_4 \mod 10$ for the pseudo-random number καί $C_4 = r_4$ div10 for the carry.

Then we assign the cell $L[-i \mod 3] = L[-4 \mod 3] = L[-1]$ to $h[-i] = h[-4]$ and $R_4$ is assigned to cell $L[-1]$ and $C_4$ is assigned to cell $U[0]$.

for i=11 we perform the operation:

$$r_{11} = (h[6]*h[-14] + h[7]*h[-13] + h[8]*h[-12] + U[0])$$

$R_{11} = r_{11} \mod 10$ for the pseudo-random number καί $C_{11} = r_{11}$ div10 for the carry.

Then we assign the cell $L[-i \mod 3] = L[-11 \mod 3] = L[-1]$ to $h[-i] = h[-11]$ and $R_{11}$ is assigned to cell $L[-1]$ and $C_{11}$ is assigned to cell $U[0]$.

for i=12 we perform the operation:

$$r_{12} = (h[6]*h[-15] + h[7]*h[-14] + h[8]*h[-13] + U[0])$$
$$\mod 10$$

$R_{12} = r_{12} \mod 10$ for the last pseudo-random number.

Then we assign the cell $L[-i \mod 3] = L[-12 \mod 3] = L[0]$ to $h[-i] = h[-12]$ and $R_{12}$ is assigned to cell $L[0]$ and $C_{12}$ is assigned to cell $U[0]$ and $U[0]$ is assigned to cell $h[-13]$.

Fortran Pseudo-Code Implementation of the Calculations of Table 1

```
Program APRNG
Implicit None
interface
Integer, dimension (1)::U
Integer, dimension (N)::L
Integer, dimension (:)::h
Integer::i,j,r,R,C
End interface
U[0]=0
L=[0]*N
Do i=1 to len(h): #Loop
    r=(h[6]*h[-i-3]+h[7]*h[-i-2]+h[8]*h[i-1]+U[0]) #Total operation product
    R=r %10 #Pseudo-random number produced with mod10 operation
    C=R//10 #Carry for the next operation product produced with div10 operation
    U[0]=C #Carry to the array U[0].
    h[-i]=L[-i %3] #The digit in the array L assigned to the position -1 to the array h.
    L[-i %3]=R #The digit in the array R assigned to the position—imod3 to the array L.
    Print *, R
end Do
end Program APRNG
```

Fortran Pseudo-code Implementation of the calculations of Table 4

```
Program APRNG
Implicit None
interface
Integer, dimension (1)::U
Integer, dimension (N)::L
Integer, dimension (:)::h
Integer::i,j,r,R,C,A
End interface
U[0]=0
L=[0]*N
R_count=0 #Counter for pseudo-random numbers
Do j=1 to D: #Loop|D=total pseudo-random numbers needed
    If R_count==D:
    end Do
    If h[0]!=0 & h[1]!=0 & h[2]!=0: #!=means "different"
        Extend h=[[0,0,0]+h] #Extended array h up to 3 zero cells at the beginning.
    elif h[0]==0 & h[1]!=0 & h[2]!=0: #==means "equal" when used in the IF/ELIF command
        Extend h=[[0,0]+h] #Extended array h up to 2 zero cells at the beginning.
    elif h[0]==0 & h[1]==0 & h[2]!=0:
        Extend h=[[0]+h] #Extended array h up to 1 zero cells at the beginning.
    Do i=1 to len(h): #Loop
        r=(h[6]*h[-i-3]+h[7]*h[-i-2]+h[8]*U[0]) #Total operation product
        R=r %10 #Pseudo-random number produced with mod10 operation
        C=R//10 #Carry for the next operation product produced with div10 operation
        U[0]=C #Carry to the array U[0].
        h[-i]=L[-i %3] #The digit in the array L assigned to the position -i to the array h.
        L[-i %3]=R #The digit in the array R assigned to the position -i %3s to the array L.
    Print*, R
    R_count=R_count+1
end Do
```

Detailed Methodology for Synchronous RPC Encryption

Figure 7:
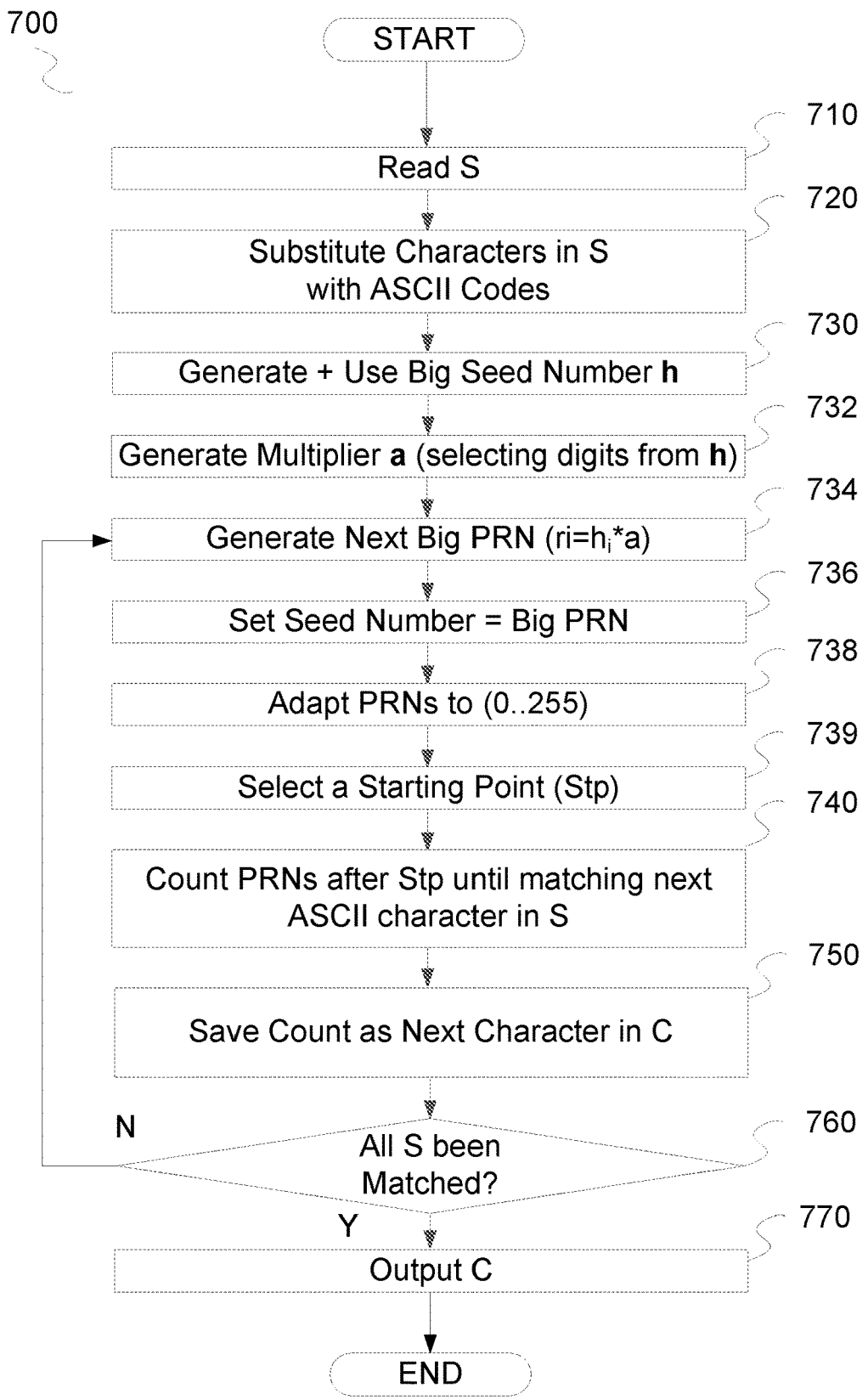
FIG. 7 shows a detailed flow diagram of the present innovative Synchronous RPC Encryption methodology.

FIG. 7 shows a detailed flow diagram of the present innovative Synchronous RPC Encryption methodology.

RPC encryption methodology 700 starts with an RPC encryption module reading input plaintext S 710 and substituting each character in S with the corresponding ASCII code 720.

An ARPNG module is used for creating and using a big seed number h 730 according to the details in the description of FIG. 6. APRNG continues by creating a multiplier a by selecting digits in h 732 and generating a next pseudo-random number $r_i$ 734 by multiplying the seed number h with the multiplier a. Having calculated the next pseudo random number $r_i$ 734, APRNG sets the seed number equal to the calculated pseudo random number $r_i$ 736 and adapts $r_i$ to fall in the range (0 . . . 255) 738.

The RPC processor selects a starting point (Stp) 739 in the pseudo-random number sequence $r_i$, resets a counter and starts counting 740 the pseudo-random numbers generated 736, 738 until a pseudo random number matching the ASCII code for the next character in plaintext S is reached, and saves the count as the next character in C 750. The methodology branches back to step 734, resets the counter, and repeats until all characters in plaintext S have been matched 760, and finally outputs counts $c_i$ 770 in array C. The pseudo-random numbers generated 734, 738 until a pseudo random number matching the ASCII code for the next character in plaintext S are counted from the Stp for the first iteration of methodology 700, and in subsequent iterations from the previous pseudo random number matching the previous character in plaintext S.

The cipher text C is then transmitted to the receiver together with a secret Key containing the seed number h, the multiplier a and the starting point Stp:

$$Key = \{h, a = (h[x_1*len(h)//x_2], h[x_3*len(h)//x_4], h[x_5*len(h)//x_6], \ldots, h[x_N*len(h)//x_{N+1}]), j, Stp\}$$

where $x_1 < x_2$, $x_3 < x_4$, $x_5$, $< x_6$, . . . , $x_N < x_{N+1}$ are positions in the length of seed number h, selected at random or according to a rule. These positions are used to select characters in seed number h and the operation len(h)//$x_2$ ("len" is the length operator [in digits], and//is the integer division).

Detailed Methodology for Synchronous RPC Decryption

Figure 8:
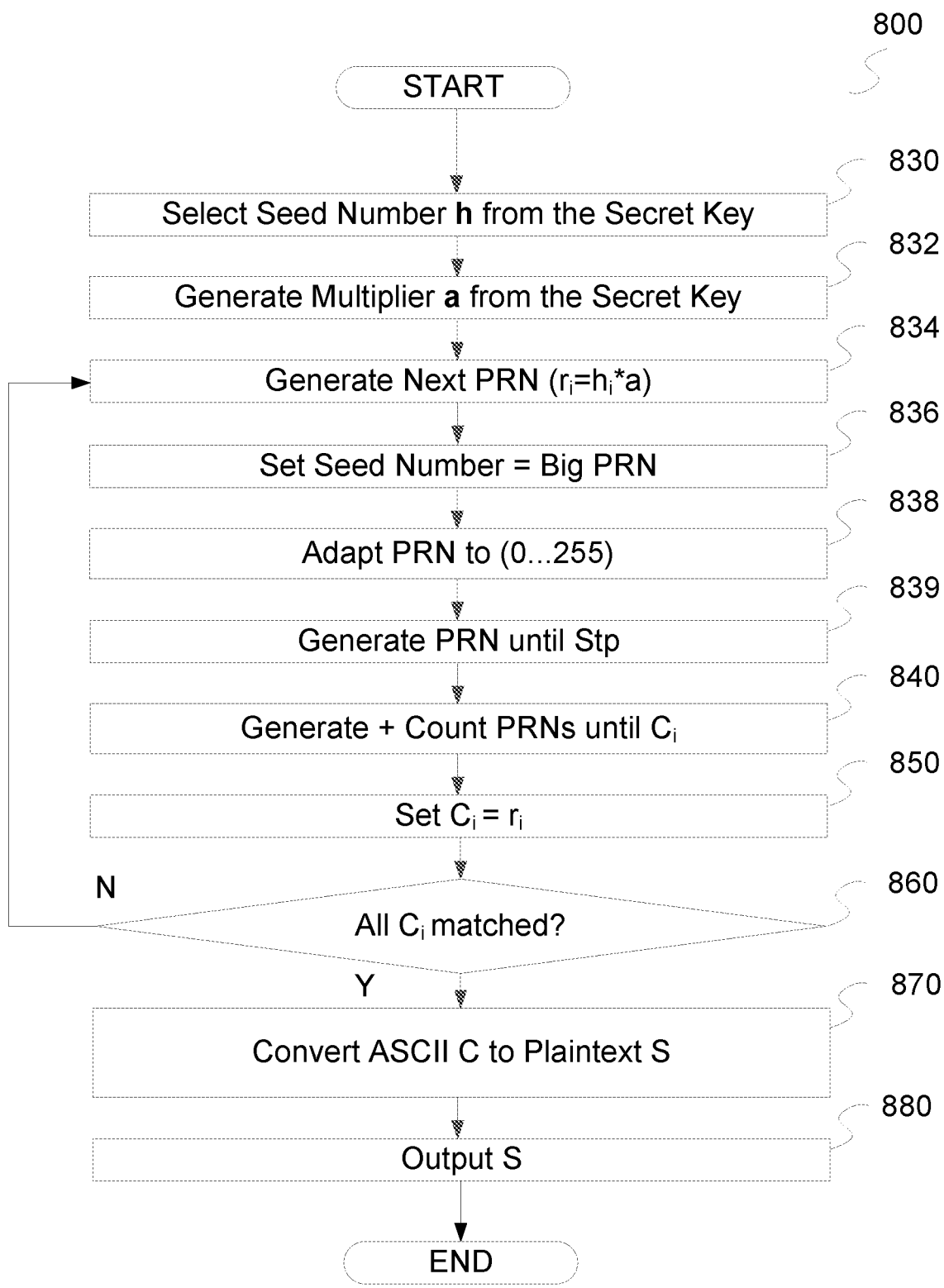
FIG. 8 shows a detailed flow diagram of the present innovative Synchronous RPC Decryption methodology.

FIG. 8 shows a detailed flow diagram of the present innovative Synchronous RPC Decryption methodology. Methodology 800 starts with a synchronous RPC decryption module selecting the seed number h from the secret Key 830, and constructing multiplier a 832 from the seed number h using positions $x_1$, $x_2$, $X_3$, $X_4$, $X_5$, $X_6$, ..., $X_N$, $X_{N+1}$.

The APRNG module generates next pseudo-random number $r_i$ 834 by multiplying the seed number h with the multiplier a 832, sets the seed number equal to the current pseudo-random number $r_i$ 836, and adapts the pseudo-random number to the range (0 ... 255) 838. In an alternative exemplary implementation, step 838 may be merged in previous steps.

The RPC decryption module commands the APRNG module to generate pseudo-random numbers until the starting point Stp is reached 839 and then starts a counter counting every pseudo random number created. When the counter reaches count $c_i$ 840 (corresponding to distance $d_i$ in FIG. 2B, the RPC decryption module sets the cipher character $c_i$ equal to the pseudo-random number $r_i$ 850, resets the counter, and repeats the process branching back to step 834 until all $c_i$ have been matched 860 and then converts the $c_i$ (corresponding to ASCII codes) into plaintext characters $S_i$ 870 and ends methodology 800 by outputting S 880. All counts $c_i$ are measured from Stp.

Detailed Methodology for Self-Synchronous RPC Encryption

The methodology for self-synchronous RPC_encryption is identical to the methodology for synchronous RPC encryption. The only difference being that the counter is reset only once and starts counting at the starting point Stp instead from every $S_i$.

Detailed Methodology for Self-Synchronous RPC Decryption

The methodology for self-synchronous RPC decryption is identical to the methodology for synchronous RPC decryption. The only difference being that the counter is reset only once and starts counting at the starting point Stp instead from every $S_i$.

Detailed Methodology for Periodically Resetting Self-Synchronous RPC Encryption

The methodology for periodically resetting self-synchronous RPC encryption is identical to the methodology for self-synchronous RPC encryption. The only difference being that the counter is reset only at the Stp and every X encrypted characters and resets and starts counting at the starting point Stp, Stp', etc. instead from every $S_i$.

Detailed Methodology for Periodically Resetting Self-Synchronous RPC Decryption

The methodology for periodically resetting self-synchronous RPC decryption is identical to the methodology for self-synchronous RPC decryption. The only difference being that the counter is reset only at the Stp and every X decrypted characters and resets and starts counting at the starting point Stp, Stp', etc. instead from every $S_i$.

Implementing a Self-Synchronous RPC Encryption and Decryption Computing Apparatus The implementation of the Self-Synchronous RPC Encryption and Decryption Computing Apparatus is identical to the computing apparatus 400 in FIG. 4 that is used for Synchronous RPC Encryption and Decryption. The only difference has to do with internal operations for calculating distances. Distances $d_i$ are now calculated for the Stp.

Implementing a Periodically Resetting Self-Synchronous RPC Encryption and Decryption Computing Apparatus The implementation of the Periodically Resetting_Self-Synchronous RPC Encryption and Decryption Computing Apparatus is identical to the computing apparatus 400 in FIG. 4 that is used for Synchronous RPC Encryption and Decryption. The only difference has to do with internal operations for calculating distances. Distances $d_i$ are now calculated for the Stp, Stp', etc.

Hardware Implementation of the APRNG

Figure 9:
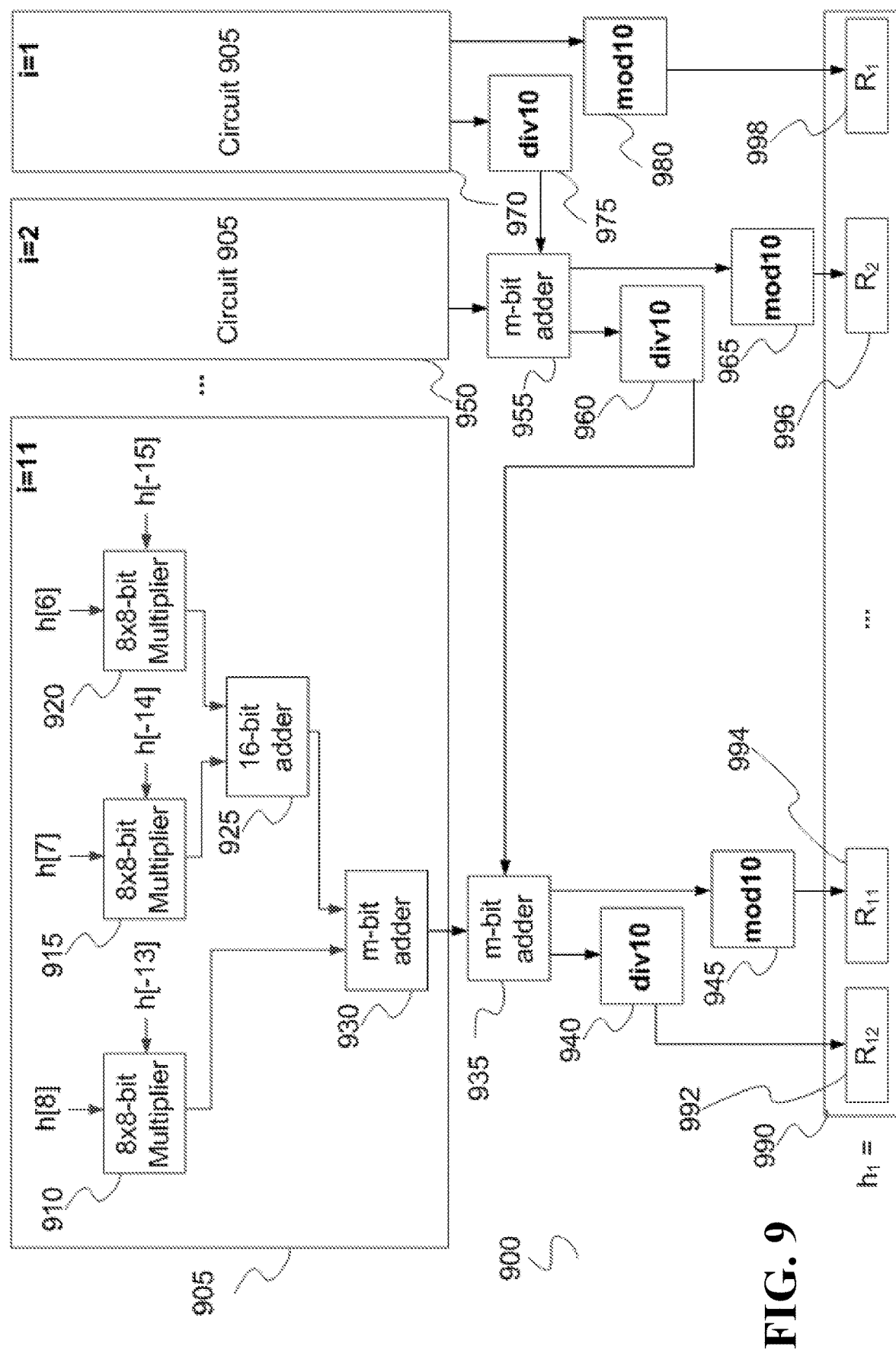
FIG. 9 shows a combinational multiplier circuit implementing the calculations of Table 1.

The present innovative APRNG can be implemented in hardware for higher speed and security. FIG. 9 shows a combinational multiplier circuit implementing the calculations of Table 1.

Circuit 900 of FIG. 9 is implemented, in one aspect, as a special-purpose microchip or micro-processor and contains a series of circuits 905, ..., 950, 970 (for i=1, 2, ..., 11) each containing the same circuit as 905 and being fed with various digits of h. Circuit 905 contains three 8×8 bit multipliers 910, 915, 920 each taking two one-digit input (one-byte) numbers. Circuit 920 takes h [6]=first digit of the multiplier a and h [−4]=fourth digit of the array h and multiplies them. At the same time, 8×8 bit multiplier 915 microprocessor takes as input the numbers: h [7]=second digit of the multiplier a and h [−3]=third digit of the end in the array h and multiplies them. The same goes for the numbers h [8] and h [−2] that the 8×8-bit multiplier 910 takes as input. Then the output from 8×8-bit multiplier 920 and the output from 8×8-bit multiplier 915 are added by 16-bit adder 925. Then the output from 16-bit adder 925 and the output from 8×8-bit multiplier 910 are added by m-bit adder 930. After that, the output from m-bit adder 930 is fed to m-bit adder 935 together with div10 960 circuit connected to circuit 950. M-bit adder 935 outputs its result to div10 (integer division) circuit 940 and mod10 (integer remainder) circuit 945, which produce single-digit random number $R_{12}$ 992 and Ru 994, respectively.

Similar to the operation of circuit 905, circuit's 970 m-bit adder outputs its result to div10 circuit 975 and mod10 circuit 980. Mod10 circuit 980 outputs $R_1$ 998 while div10 circuit 975 outputs to m-bit adder 955 which also receives the output of circuit's 950 m-bit adder. M-bit adder 955 outputs to div10 circuit 960 and to mod10 circuit 965. Mod10 circuit 965 outputs $R_2$ while div10 circuit 960 outputs to the m-bit adders of other cascaded circuits of the form of circuit 905, which ultimately feed m-bit adder 935 which also receives the output of circuit's 905 m-bit adder 930.

Pseudo-random number $h_1$ 990 is formed by the outputs of div10 circuit 940 and mod10 circuits 945, ..., 965, 980 in this order.

Verilog Code (HDL-Hardware Description Language) with Arithmetic Operations for Circuit in FIG. 9 module Multiplication(input h[6], h[7],h[8],h[−2], h[−3], h[−4],h[−5],h[−6],h[−7],h[−8],h[−9],h[−10],h[−11], h[−12], h[−13], h[−14], h[−15], output U[0], $R_1$, $R_2$, $R_3$, $R_4$, $R_5$, $R_6$, $R_7$, $R_8$, $R_9$, $R_{10}$, $R_{11}$, $R_{12}$, $r_1$, $r_2$, $r_3$, $r_4$, $r_5$, $r_6$, $r_7$, $r_8$, $r_9$, $r_{10}$, $r_{11}$, $r_{12}$);
input [7:0] h[6], h[7], h[8], h[2], h[−3], h[−4], h[−5], h[−6], h[−7], h[−8], h[−9], h[−10],h[−11], h[−12] h[−13], h[−14], h[−15];
output [7:0] $R_1$, $R_2$, $R_3$, $R_4$, $R_5$, $R_6$, $R_7$, $R_8$, $R_9$, $R_{10}$, $R_{11}$, $R_{12}$;
output [7:0] $r_1$, $r_2$, $r_3$, $r_4$, $r_5$, $r_6$, $r_7$, $r_8$, $r_9$, $r_{10}$, $r_{11}$, $r_{12}$;
output [7:0] U[0];
wire $r_1$=h[6]*h[−4]+h[7]*h[−3]+h[8]*h[−2]+0
assign $R_1$=$r_1$% 10 assign U[0]=$r_1$//10
wire $r_2$=h[6]*h[−5]+h[7]*h[−4]+h[8]*h[−3]+U[0]
assign $R_2$=$r_2$% 10
assign U[0]=$r_2$//10
wire $r_3$=h[6]*h[−6]+h[7]*h[−5]+h[8]*h[−4]+U[0]
assign $R_3$=$r_3$% 10
assign U[0]=$r_3$//10
wire $r_4$=h[6]*h[−7]+h[7]*h[−6]+h[8]*h[−5]+U[0]
assign $R_4$=$r_4$% 10
assign U[0]=$r_4$//10
wire $r_5$=h[6]*h[−8]+h[7]*h[−7]+h[8]*h[−6]+U[0]
assign $R_5$=$r_5$% 10
assign U[0]=$r_5$//10
wire $r_6$=h[6]*h[−9]+h[7]*h[−8]+h[8]*h[−7]+U[0]
assign $R_6$=$r_6$% 10
assign U[0]=$r_6$//10
wire $r_7$=h[6]*h[−10]+h[7]*h[−9]+h[8]*h[−8]+U[0]
assign $R_7$=$r_7$% 10
assign U[0]=$r_7$//10
wire $r_8$=h[6]*h[−11]+h[7]*h[−10]+h[8]*h[−9]+U[0]
assign $R_8$=$r_8$% 10
assign U[0]=$r_8$//10
wire $r_9$=h[6]*h[−12]+h[7]*h[−11]+h[8]*h[−10]+U[0]
assign $R_9$=$r_9$% 10
assign U[0]=$r_9$//10
wire $r_{10}$=h[6]*h[−13]+h[7]*h[−12]+h[8]*h[−11]+U[0]
assign $R_{10}$=$r_{10}$% 10
assign U[0]=$r_{10}$//10
wire $r_{11}$=h[6]*h[−14]+h[7]*h[−13]+h[8]*h[−12]+U[0]
assign $R_{11}$=$r_{11}$% 10
assign U[0]=$r_{11}$//10
wire $r_{12}$=h[6]*h[−15]+h[7]*h[−14]+h[8]*h[−13]+U[0]
assign $R_{12}$=$r_{12}$
endmodule Hardware Implementation of an 8×8 Multiplier Circuit FIG. 10 shows a mid-level hardware implementation of an 8×8 multiplier circuit. 8×8 multiplier circuit 1000 is made up of a cascade of circuit modules 1010, 1020, 1060 implementing half adders 1010, full adders 1020, 1060 and logical adders 1030 (AND gates). The cascaded circuit modules implement the long multiplications described above by feeding the partial results from each circuit module to the next modules in the cascade.

Figure 11:
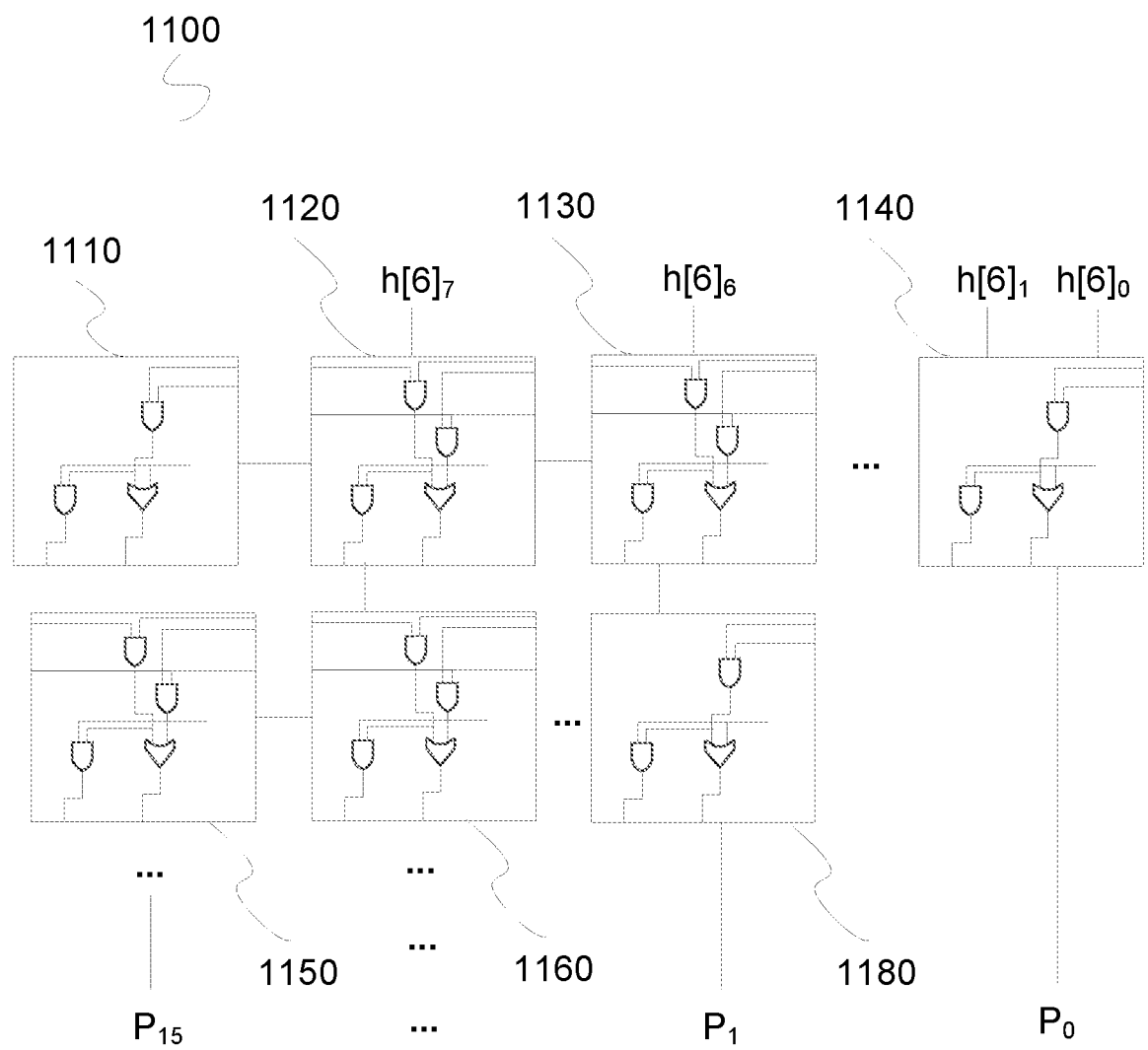
FIG. 11 shows a low-level hardware implementation of an 8×8 multiplier circuit.

FIG. 11 shows a low-level hardware implementation of an 8×8 multiplier circuit. It is a low-level view of the circuit of FIG. 10. Circuit 1100 is made up of a cascade of circuit modules 1110-1180 implementing half adders 1110, 1180 full adders 1120-1160 and logical adders (AND gates). The half adders and the full adders are implemented as an ordered collection of interconnected logic AND, OR, and XOR gates.

In particular, a half adder takes as input h[6]$_7$ and h[−4]$_1$ and logically ANDs them at a first AND gate 1112, while feeding the result of the operation to an XOR 1114 and a second AND gate 1116. The result of the second AND gate 1116 takes the output of the first logic AND 1112 and the output from a full adder 1120 it is connected to and logically ends them. The XOR gate 1114 takes as input the first AND output 1112 and the output from the same full adder 1120 that is fed to the second adder 1110 and logically XORs 1114 them.

A first full adder 1150 at a first level takes as input h[6]$_7$ and h[−4]$_0$ and logically ANDs them at a first AND gate, while feeding the result of the operation to a first XOR. The first XOR gate performs a logic XOR operation to the output of the first AND gate and the output of a second AND gate, which second AND gate logically ANDs h[6]$_6$ and h[−4]$_1$.

The output of the first XOR gate is fed to a second XOR gate together with the output of a logic OR gate from a second full adder at the first level connected with the first full adder at the same level. The output of the second XOR gate of the first full adder at the first level is fed to a first XOR gate at a third full adder at a second level.

The outputs of the first and the second AND gates of the first full adder 1150 at the first level are also fed to a third AND gate whose output is fed, together with the output of the first XOR gate to the OR gate of the same full adder. The output of the OR gate of the first full adder at the first level is then fed to the XOR gate of the half adder. For all other full adders of the circuit of FIG. 11 the output of their OR gate is fed to the second XOR gate of the next full adder at the same level that the full adder is connected to, effectively representing the carry number for the current multiplication operation performed by the full adder.

Effectively, each full adder outputs a partial result from its second XOR gate to a full adder at the next level until the higher level's second XOR gate outputs a single-bit of the pseudo-random number and all the pseudo random single-bit numbers, taken in order, make up a long pseudo random number.

The cascaded circuit modules implement the long multiplications described above by feeding the partial results from each circuit module to the next modules in the cascade. The outputs of circuits 1140, 1180, . . . , 1150 are $P_0$, $P_1$, . . . , $P_{15}$, respectively.

Verilog Code (HDL-Hardware Description Language) with Arithmetic Operations for the Circuit in FIG. 11
 module Multiplication(input h[6], h[−4] output P); #FIG. 11
 input [7:0] h[6];
 input [7:0] h[−4];
 output [15:0] P;
 assign P=h[6] *h[−4];
 endmodule Verilog Code (HDL-Hardware Description Language) with Bitwise Operations for the Circuit in FIG. 11
 module AndGate1(input h[6]$_0$, h[−4]$_0$, output $P_0$);
 assign $P_0$=h[6]$_0$ & h[−4]$_0$;
 endmodule
 module HA$_2$(input h[6]$_0$, h[6]$_1$, h[−4]$_0$, h[−4]$_1$ output cout2, $P_1$); # (2000)
 assign $P_1$=(h[6]$_1$ & h[−4]$_0$)^(h[6]$_0$ & h[−4]$_1$);
 assign cout2=(h[6]$_1$ & h[−4]$_0$)& (h[6]$_0$ & h[−4]$_1$);
 endmodule
 module FA$_3$(input cout2, h[6]$_2$, h[−4]$_0$, h[6]$_1$, h[−4]$_1$, h[6]$_0$, h[−4]$_2$, output cout3, cout4, $P_2$);
 wire w1=(h[6]$_2$ & h[−4]$_0$);
 wire w2=(h[6]$_1$ & h[−4]$_1$);
 wire w3=(w1^w2);
 wire w4=(w1 & w2);
 wire w5=(w4 ^cout2);
 wire w6=(w4 & cout2);
 assign cout3=(w4|w6);
 wire w7=(h[6]$_0$ & h[−4]$_2$);
 assign $P_2$=(w5 ^w7);
 assign cout4=(w5 & w7);
 endmodule
  (repeat the same for the other bits)

Detailed Circuit with Logical Gates Based on the Circuit of FIG. 9

Figure 12:
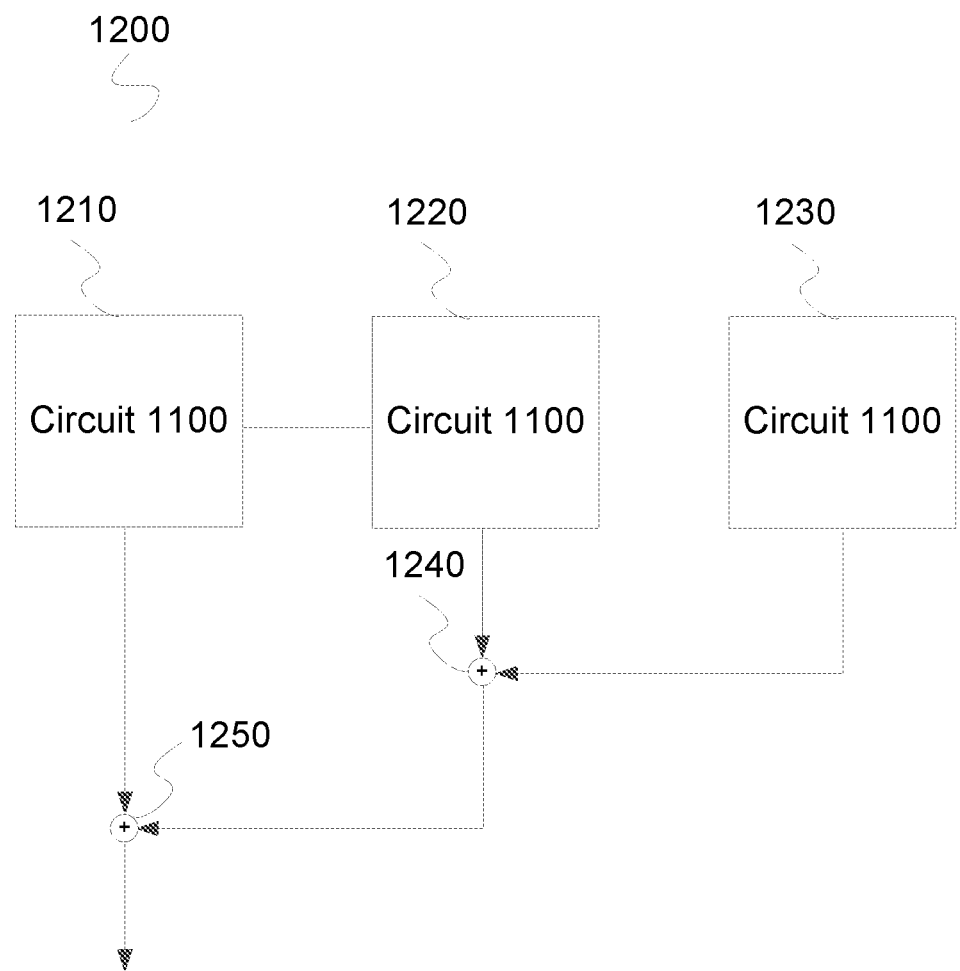
FIG. 12 shows a detailed circuit (901) using Logical Gates based on the circuit of FIG. 5.

FIG. 12 shows a detailed circuit using Logical Gates based on the circuit of FIG. 9. Circuit 1200 is a cascade of partial circuits 1200 (1210, 1220, 1230) implementing full and partial adders, and outputting towards the div and mod operator circuits (the div and mod operator circuits are not shown). The full and partial adders are the same circuits shown in FIG. 11. Partial results are summed by adders 1240, 1250.

Figure 13:
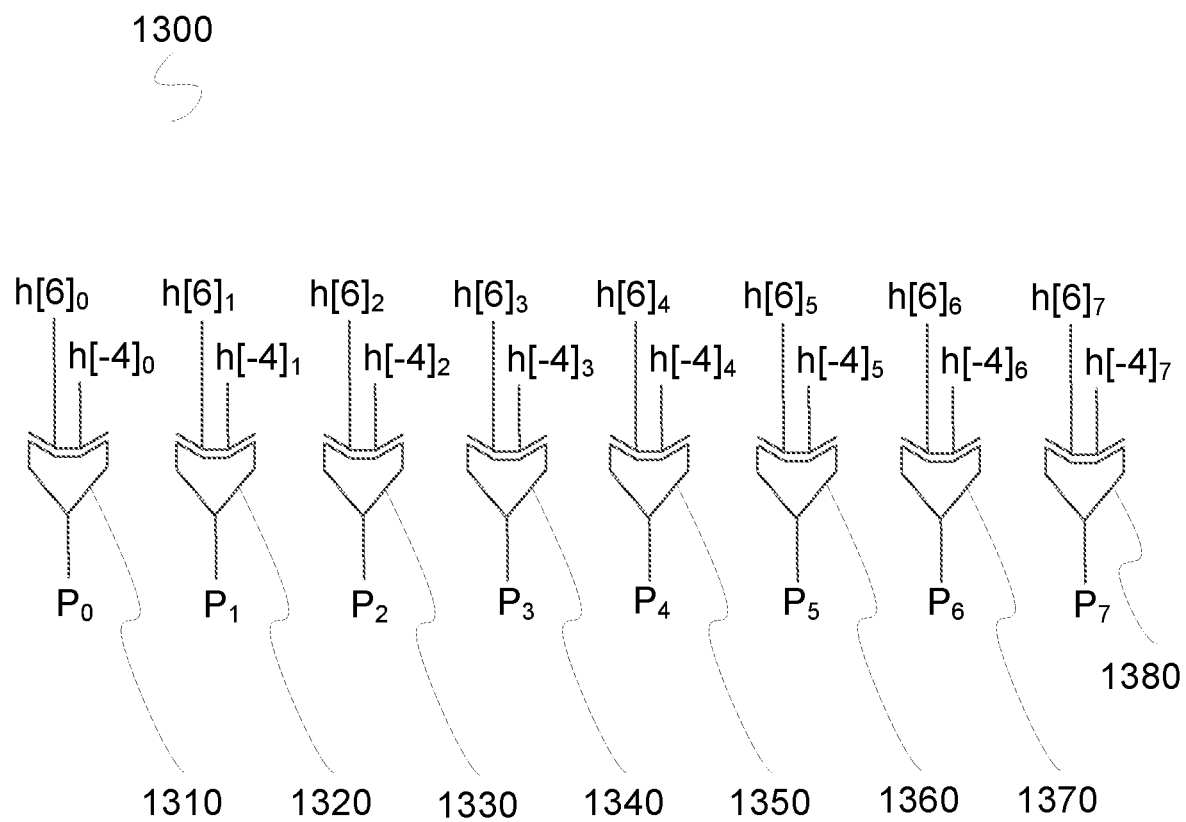
FIG. 13 shows a detailed circuit for the XOR operations of the 4th Exemplary Embodiment.

Verilog Code (HDL-Hardware Description Language) with Arithmetic Operations for the Circuit in FIG. 12 module Multiplication(input h[6], h[7], h[8], h[−4], h[−3], h[−2], output Sum1, $r_1$, $R_1$); #FIG. 13
    input [7:0] h[6], h[7], h[8], h[−4], h[−2];
    output [16:0] Sum1;
    output [16:0] $r_1$;
    output [7:0] $R_1$;
    output [7:0] U[0];
    wire sum1=h[6]*h[−4]+h[7]*h[−3]
    wire $r_1$=sum1+h[8]*h[−2]
    assign $R_1$=$r_1$%10
    assign U[0]=$r_1$//10
    endmodule The above hardware circuits are used by the present innovative APRNG when implemented in hardware for speeding up the calculations needed to create the pseudo random number sequences. Despite the fact that logic gates and circuit modules known in prior art for other purposes are also used above, the present innovative APRNG presents a novel hardware implementation by modifying the operation of the circuit modules. In particular, the present APRNG selectively switches the above circuit modules (refer to FIG. 9, as opposed to the use of the circuit modules for ordinary arithmetic calculations), effectively achieving significant speed improvements as opposed to any "ordinary" calculation of the pseudo random numbers without using the proposed simplifications.

Overall Hardware Implementation of the APRNG

Figure 14:
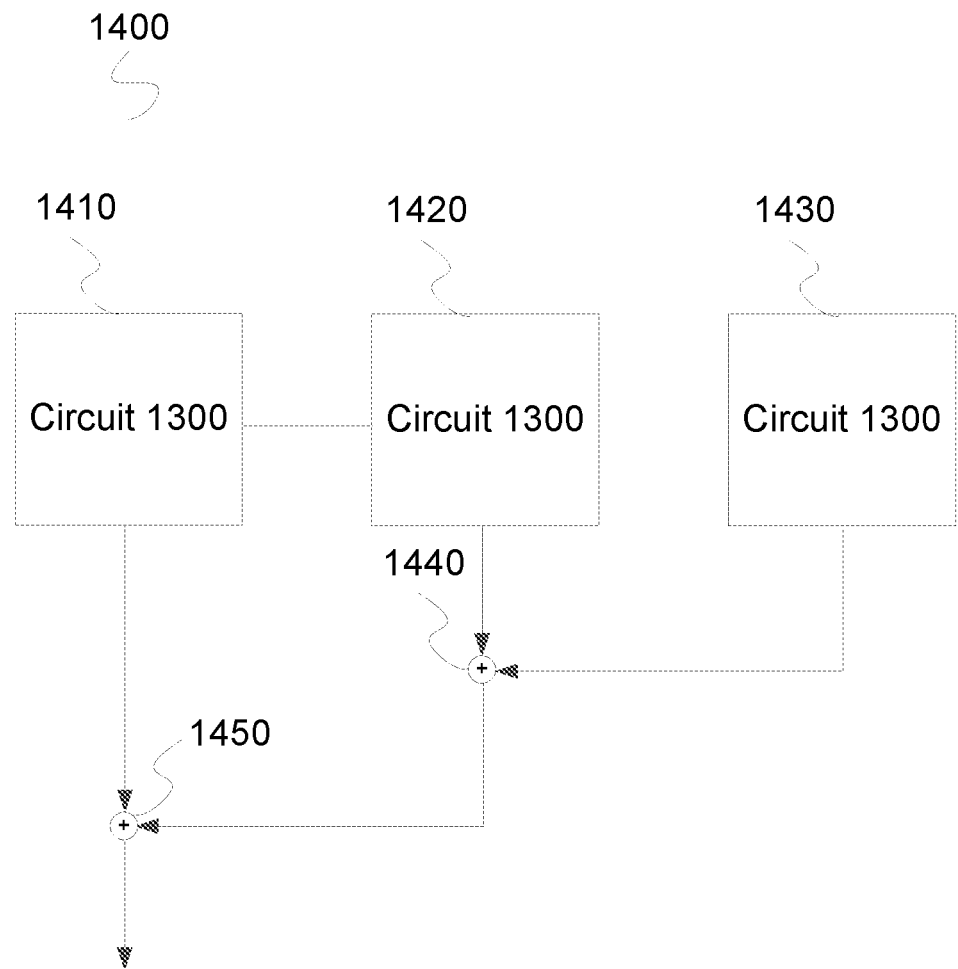
FIG. 14 shows an exemplary overall hardware architecture of the APRNG.

FIG. 14 shows an exemplary overall hardware architecture of the APRNG. The APRNG 1400 is implemented by one or more processors, each having one or more processing cores. The processors may be located inside the same computing apparatus, or in more than one computing apparatuses (e.g. in the case of distributed or cloud computing). These implementations are obvious to any reader of basic skill in related art.

Considering, for simplicity, the exemplary implementation where a single processor with a single processing core is used to implement the APRNG, APRNG 1400 is implemented using an LCG module 1430 for generating a first sequence of pseudo random numbers, a Big Number Generator (BNG) module 1440 for generating big numbers using the first sequence of pseudo random numbers, and an Aperiodic Pseudo Random Number Generator Module (APRNGM) 1450 for calculating aperiodic pseudo random numbers from the big numbers. The APRNG is also connected to a computer clock module 1410, and to a user interface module 1420 for accepting user input. The LCG 1430, BNG 1440, and APRNGM 1450 modules are connected with a memory module 1460. Additional modules that are obvious are omitted. Equally, it is accepted that modifications to this architecture can be made.

In a variation of the exemplary implementation of FIG. 14 LCG module 1430 may be replaced by any pseudo-random number generator module.

Evaluation of the Performance of the Present Innovative RPC Methodologies

Comparison of AES-256 with RPC-256

Years of Computing with supercomputer FRONTIER (1.5 exaflop) for exhaustive key search, which has been produced with the AES-256 crypto algorithm==$2^{256}/(15*(10^{17})*365*24*60*60)$==$10^{77}/(15*(10^{17})*365*24*60*60)$
$==10^{77}/$
$10^{26}$==244782870872053516454361121699407889086 0603430273138 years ~=$10^{51}$ years Years of Computing with supercomputer FRONTIER (1.5 exaflop) for exhaustive key search, which has been produced with the RPC-256 crypto algorithm=~=$(10^{77})*(77^{6}+ \ldots +77^{3})*(j-3)*(10^{6})/(15*(10^{17})*365*24*60*60)$  ~=$(10^{77})*(17^{12})*(4-3)*(106)/(15*(10^{17})*365*24*60*60)$
~=$10^{95}/(15*(10^{17})*(10^{8}))$ ~=$10^{95}/(10^{26})$ ~=$10^{69}$ years The improvement in security offered by the proposed PRC methodologies over AES for the same number of digits (256 digits) is obvious. (Note that $2^{256}$=1077).

In particular, RPC-256 is $10^{18}$ times more secure than AES-256.

It is very important to note that the secret key is arbitrary long without any effect in the speed of calculations. This serious advantage is in contrast to known encryption algorithms that where the secret key length is increased there is a significant increase in the amount of calculations resulting in longer calculation times.

Comparison of AES-256 with RPC-200 (for minimum RPC-Key length)

For AES-256 $2^{256}$==115792089237316195423570985008687907853269984665640564039457584007913 12963993, i.e. 77 digits Years of Computing with supercomputer FRONTIER (1.5 exaflop) for exhaustive key search which has been produced with the AES-256 crypto algorithm==$2^{256}/(15*(10^{17})*365*24*60*60)$
==244782870872053516454361121699407889086060343 0273138 years ~=$10^{"}51$ years For RPC-200 $10^{61}$==10000000000000000000000000000000000000000 0000000000000000000000, i.e. 61 digits.

Years of Computing with supercomputer FRONTIER (1.5 exaflop) for exhaustive key search which has been produced with the RPC-200 crypto algorithm=~=$(10^{61})*(61^{6}+ \ldots +61^{3})*(j-3)*(10^{6})/(15*(10^{17})*365*24*60*60)$
~=$(10^{61})*(10^{11})*(4-3)*(10^{6})/(15*(10^{17})*365*24*60*60)$  ~=$10^{78}/(15*(10^{17})*(10^{8}))$ ~=$10^{78}/(10^{26})$ ~=$10^{52}$ years The improvement in security offered by the proposed PRC methodologies over AES for minimum RPC-Key length (200-digit long key) is obvious. (Note that $2^{200}$~=$10^{61}$).

In particular, RPC-200 is 10 times more secure than AES-256.

The above exemplary implementations of the present innovative solution are not to be deemed as falling into the category of not patentable subject matter, and in particular they do not constitute automation or mere computer implementations of mental processes and non-patentable subject matter. The reason for not being directed to mental processes and non-patentable subject matter stems from the fact that the above exemplary implementations use a set of methodologies, hardware and software implementations that combine and transform individual known concepts, circuits, and software for general-purpose solutions to specific solutions for RPC encryption and decryption and APRNGs with faster operation than prior art, reduced processing requirements, and significantly longer periods in the created pseudo-random number generators. As a result, the known concepts, circuits, and software are repurposed to operate in a novel and distinct way that solve a very specific and previously unsolved problem, thus rendering them innovative and unanticipated to persons of ordinary skill in related art.

The examples used above to describe the present innovative solution should not be viewed as limiting the scope of the present innovative solution. The present innovative solution may be applied to use scenarios and settings other than those described in the presented examples.

The above exemplary are intended for use either as a standalone system or method in any conceivable scientific and business domain, or as part of other scientific and business methods, processes and systems.

The above exemplary embodiment descriptions are simplified and do not include hardware and software elements that are used in the embodiments but are not part of the current invention, are not needed for the understanding of the embodiments, and are obvious to any user of ordinary skill in related art. Furthermore, variations of the described method, system architecture, and software architecture are possible, where, for instance, method steps, and hardware and software elements may be rearranged, omitted, replaced with equivalent, or new added.

Various embodiments of the invention are described above in the Detailed Description. While these descriptions directly describe the above embodiments, it is understood that those skilled in the art may conceive modifications and/or variations to the specific embodiments shown and described herein unless specifically excluded. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s).

The foregoing description of a preferred embodiment and best mode of the invention known to the applicant at this time of filing the application has been presented and is intended for the purposes of illustration and description. It is not intended to be exhaustive or limit the invention to the precise form disclosed and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated. Therefore, it is intended that the invention not be limited to the particular embodiments disclosed for carrying out this invention, but that the invention will include all embodiments falling within the scope of the appended claims.

In one or more exemplary embodiments, the functions described may be implemented in hardware, software, firmware, or any combination thereof. If implemented in software, the functions may be stored on or transmitted over as one or more instructions or code on a computer readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or any other device or apparatus operating as a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of encrypting plaintext using a one or more Random Position Cipher (RPC) processors, comprising:
   substituting a sequence of characters in a plaintext with American Standard Code for Information Interchange (ASCII) codes associated with the sequence of characters in the plaintext;
   generating by one or more hardware processors, a command to cause an Aperiodic Pseudo-Random Number Generator (APRNG) to create a sequence of pseudo random numbers, where pseudo-random numbers in the sequence of pseudo random numbers are configured to range from 0 to 255;
   selecting a current starting point in the sequence of pseudo random numbers;
   resetting to a value of 0 and starting a first counter to count the pseudo-random numbers generated by the APRNG after the current starting point in the sequence of pseudo random numbers and until a pseudo random number matches the ASCII code of a next character in the plaintext;
   storing the first counter's value to a ciphertext in a memory;
   repeating the previous two steps until all characters in the plaintext have been associated with a character in the ciphertext;
   constructing a secret key; and
   outputting the ciphertext and the secret key;
   wherein the APRNG creating the sequence of pseudo-random numbers involves:
   creating a current seed number;
   generating a plurality of large pseudo-random numbers by (a) multiplying the current seed number with a current multiplier, and (b) setting (i) the current multiplier equal to a result of a random selection of digits of the current seed number and (ii) the current seed number equal to the large pseudo-random number; and
   splitting at least one large pseudo-random number of the plurality of large pseudo-random numbers into a sequence of pseudo-random numbers.

2. The method of claim 1, where:
   the current seed number is created by multiplying three readings of a computer clock; and the secret key comprises:
an initial seed number that is configured to be used as the current seed number prior to modifying a value of the current seed number in step (b)(ii);
an initial multiplier that is configured to be used as the current multiplier prior to modifying a value of the current multiplier in step (b)(i), where each digit of the initial multiplier is calculated as a first random position selected from the initial seed number multiplied with a result of an integer division of a length in digits of the current seed number by a second random position selected from the current seed number, and where for each digit of the initial multiplier a different first digit and second digit of the initial seed number are used.

3. The method of claim 1, further comprising one of:
resetting the first counter to a value of 0 when a pseudo random number matches the ASCII code of the next character in the plaintext;
resetting the current starting point to a value of a next starting point every time the first counter reaches a constant value since the current starting point, where the next starting point is equal to the sum of the current starting point and the constant value; and
resetting the current starting point to a value of a next starting point every time the first counter reaches a pseudo random number, generated by the APRING, since the current starting point, where the next starting point is equal to the sum of the current starting point and the pseudo random number.

4. A method of decrypting ciphertext using a one or more Random Position Cipher (RPC) processors, comprising:
selecting a current seed number from a secret key;
constructing a current multiplier from the current seed number by selectively combining digits from the current seed number;
generating by one or more hardware processors, a command to cause an Aperiodic Pseudo-Random Number Generator (APRNG) to create a sequence of pseudo random numbers, where pseudo-random numbers in the sequence of pseudo random numbers are configured to fall in a range of values from 0 to 255;
selecting a current starting point, in the sequence of pseudo random numbers, from the secret key;
resetting to a value of 0 and starting a first counter to count the pseudo-random numbers generated by the APRNG after the current starting point in the sequence of pseudo random numbers and until a value of the first counter equals a next character in the ciphertext;
storing at a memory the pseudo-random number associated with the value of the current counter, where the stored pseudo-random number is an American Standard Code for Information Interchange (ASCII) code;
repeating the previous two steps until all characters in the ciphertext have been associated with an ASCII) code;
replacing the ASCII codes with characters associated with the ASCII codes;
storing at the memory the characters associated with the ASCII codes, where the stored characters are plaintext characters; and
outputting the plaintext characters;
wherein the APRNG creating the sequence of pseudo-random numbers involves:
creating a current seed number;
generating a plurality of large pseudo-random numbers by (a) multiplying the current seed number with a current multiplier, and (b) setting (i) the current multiplier equal to a result of a random selection of digits of the current seed number and (ii) the current seed number equal to the large pseudo-random number; and
splitting at least one large pseudo-random numbers of the plurality of large pseudo-random numbers into a sequence of pseudo-random numbers.

5. The method of claim 4, where the secret key comprises:
an initial seed number that is configured to be used as the current seed number prior to modifying a value of the current seed number in step (b)(ii); and
an initial multiplier that is configured to be used as the current multiplier prior to modifying a value of the current multiplier in step (b)(i), where each digit of the initial multiplier is calculated as a first random position selected from the initial seed number multiplied with a result of an integer division of a length in digits of the current seed number by a second random position selected from the current seed number, and where for each digit of the initial multiplier a different first digit and second digit of the initial seed number are used.

6. The method of claim 4, further comprising one of:
resetting the first counter to a value of 0 when a pseudo random number matches the ASCII code of the next character in the plaintext;
resetting the current starting point to a value of a next starting point every time the first counter reaches a constant value since the current starting point, where the next starting point is equal to the sum of the current starting point and the constant value; and
resetting the current starting point to a value of a next starting point every time the first counter reaches a pseudo random number, generated by the APRNG, since the current starting point, where the next starting point is equal to the sum of the current starting point and the pseudo random number.

7. A computer program product including one or more computer readable mediums for encrypting plaintext, having instructions encoded thereon that, executed by a Random Position Cipher (CPR) encryption processor to:
substitute a sequence of characters in a plaintext with American Standard Code for Information Interchange (ASCII) codes associated with the sequence of characters in the plaintext;
generate a command to cause an Aperiodic Pseudo-Random Number Generator (APRNG) to create a sequence of pseudo random numbers, where pseudo-random numbers in the sequence of pseudo random numbers are configured to range from 0 to 255;
select a current starting point in the sequence of pseudo random numbers;
reset to a value of 0 and start a first counter to count the pseudo-random numbers generated by the APRNG after the current starting point in the sequence of pseudo random numbers and until a pseudo random number matches the ASCII code of a next character in the plaintext;
store the first counter's value to a ciphertext in a memory module;
repeat the previous two steps until all characters in the plaintext have been associated with a character in the ciphertext;
construct a secret key; and
output the ciphertext and the secret key;
wherein the APRNG creating the sequence of pseudo-random numbers further comprises instructions to cause the APRNG to:

create a current seed number;
generate a plurality of large pseudo-random numbers by (a) multiplying the current seed number with a current multiplier, and (b) setting (i) the current multiplier equal to a result of a random selection of digits of the current seed number and (ii) the current seed number equal to the large pseudo-random number; and
split at least one large pseudo-random number of the plurality of large pseudo-random numbers into a sequence of pseudo-random numbers.

8. The computer program product of claim 7, where:
the current seed number is created by multiplying three readings of a computer clock; and
the secret key comprises:
an initial seed number that is configured to be used as the current seed number prior to modifying a value of the current seed number in step (b)(ii);
an initial multiplier that is configured to be used as the current multiplier prior to modifying a value of the current multiplier in step (b)(i), where each digit of the initial multiplier is calculated as a first random position selected from the initial seed number multiplied with a result of an integer division of a length in digits of the current seed number by a second random position selected from the current seed number, and where for each digit of the initial multiplier a different first digit and second digit of the initial seed number are used.

9. The computer program product of claim 7, further comprising instructions to cause the RPC encryption processor to perform one of:
resetting the first counter to a value of 0 when a pseudo random number matches the ASCII code of the next character in the plaintext; and
resetting the current starting point to a value of a next starting point every time the first counter reaches a constant value since the current starting point, where the next starting point is equal to the sum of the current starting point and the constant value; and
resetting the current starting point to a value of a next starting point every time the first counter reaches a pseudo random number, generated by the APRNG, since the current starting point, where the next starting point is equal to the sum of the current starting point and the pseudo random number.

10. A computer program product including one or more computer readable mediums for decrypting ciphertext, having instructions encoded thereon that, executed by a Random Position Cipher (CPR) decryption processor to:
select a current seed number from a secret key;
construct a current multiplier from the current seed number, by selectively combining digits from the current seed number;
generate a command to cause an Aperiodic Pseudo-Random Number Generator (APRNG) to create a sequence of pseudo random numbers, where pseudo-random numbers in the sequence of pseudo random numbers are configured to fall in a range of values from 0 to 255;
select a current starting point, in the sequence of pseudo random numbers, from the secret key;
reset to a value of 0 and start a first counter to count the pseudo-random numbers generated by the APRNG after the current starting point in the sequence of pseudo random numbers and until a value of the first counter equals a next character in the ciphertext;
store at a memory module the pseudo-random number associated with the value of the current counter, where the stored pseudo-random number is an American Standard Code for Information Interchange (ASCII) code;
repeat the previous two steps until all characters in the ciphertext have been associated with an ASCII code;
replace the ASCII codes with characters associated with the ASCII codes;
store at the memory module the characters associated with the ASCII codes, where the stored characters are plaintext characters; and
output the plaintext characters;
wherein the APRNG creating the sequence of pseudo-random numbers further comprises instructions to cause the APRNG to:
create a current seed number;
generate a plurality of large pseudo-random numbers by (a) multiplying the current seed number with a current multiplier, and (b) setting (i) the current multiplier equal to a result of a random selection of digits of the current seed number and (ii) the current seed number equal to the large pseudo-random number; and
split at least one large pseudo-random numbers of the plurality of large pseudo-random numbers into a sequence of pseudo-random numbers.

11. The computer program product of claim 10, where the secret key comprises:
an initial seed number that is configured to be used as the current seed number prior to modifying a value of the current seed number in step (b)(ii); and
an initial multiplier that is configured to be used as the current multiplier prior to modifying a value of the current multiplier in step (b)(i), where each digit of the initial multiplier is calculated as a first random position selected from the initial seed number multiplied with a result of an integer division of a length in digits of the current seed number by a second random position selected from the current seed number, and where for each digit of the initial multiplier a different first digit and second digit of the initial seed number are used.

12. The computer program product of claim 10, further comprising instructions to cause the RPC decryption processor to perform one of:
resetting the first counter to a value of 0 when a pseudo random number matches the ASCII code of the next character in the plaintext;
resetting the current starting point to a value of a next starting point every time the first counter reaches a constant value since the current starting point, where the next starting point is equal to the sum of the current starting point and the constant value; and
resetting the current starting point to a value of a next starting point every time the first counter reaches a pseudo random number, generated by the APRNG, since the current starting point, where the next starting point is equal to the sum of the current starting point and the pseudo random number.

13. A computing apparatus for encrypting plaintext, the computing apparatus comprising:
one or more hardware processors;
a memory configured for storing a plurality of data;
a computer clock;
an Aperiodic Pseudo-Random Number Generator (APRNG); and a Random Position Cipher (RPC) processor configured to:
substitute sequence of characters in a plaintext with American Standard Code for Information Interchange ASCII) codes associated with the sequence of characters in the plaintext;
generate a command to cause the APRNG to create a sequence of pseudo random numbers, where pseudo-random numbers in the sequence of pseudo random numbers are configured to range from 0 to 255;
select a current starting point in the sequence of pseudo random numbers;
reset to a value of 0 and start a first counter to count the pseudo-random numbers generated by the APRNG after the current starting point in the sequence of pseudo random numbers and until a pseudo random number matches the ASCII code of a next character in the plaintext;
store the first counter's value to a ciphertext in a memory;
repeat the previous two steps until all characters in the plaintext have been associated with a character in the ciphertext;
construct a secret key;
and output the ciphertext and the secret key; where the APRNG creating the sequence of pseudo-random numbers is configured to: create a current seed number;
generate a plurality of large pseudo-random numbers by (a) multiplying the current seed number with a current multiplier, (b) setting (i) the current multiplier equal to a result a random selection of digits of the current seed number and (ii) the current seed number equal to the large pseudo-random number; and
split at least one large pseudo-random number of the plurality of large pseudo-random numbers into a sequence of pseudo-random numbers.

14. The computing apparatus of claim 13, where:
the current seed number is created by multiplying three readings of a computer clock; and
the secret key includes:
an initial seed number that is configured to be used as the current seed number prior to modifying a value of the current seed number in step (b)(ii);
an initial multiplier that is configured to be used as the current multiplier prior to modifying a value of the current multiplier in step (b)(i), where each digit of the initial multiplier is calculated as a first random position selected from the initial seed number multiplied with a result of an integer division of a length in digits of the current seed number by a second random position selected from the current seed number, and where for each digit of the initial multiplier a different first digit and second digit of the initial seed number are used.

15. The computing apparatus of claim 14, wherein it is further configured to:
reset the first counter to a value of 0 when a pseudo random number matches the ASCII code of the next character in the plaintext;
reset the current starting point to a value of a next starting point every time the first counter reaches a constant value since the current starting point, where the next starting point is equal to the sum of the current starting point and the constant value; and
reset the current starting point to a value of a next starting point every time the first counter reaches a pseudo random number, generated by the APRNG, since the current starting point, where the next starting point is equal to the sum of the current starting point and the pseudo random number.

16. A computing apparatus for decrypting ciphertext, the computing apparatus comprising:
one or more hardware processors;
a memory configured for storing a plurality of data;
a computer clock;
an Aperiodic Pseudo-Random Number Generator (APRNG); and
a Random Position Cipher (RPC) processor configured to:
select a current seed number from a secret key;
construct a current multiplier from the current seed number, by selectively combining digits from the current seed number;
generate a command to cause an Aperiodic Pseudo-Random Number Generator (APRNG) to create a sequence of pseudo random numbers, where pseudo-random numbers in the sequence of pseudo random numbers are configured to fall in a range of values from 0 to 255;
select a current starting point, in the sequence of pseudo random numbers, from the secret key;
reset to a value of 0 and start a first counter to count the pseudo-random numbers generated by the APRNG after the current starting point in the sequence of pseudo random numbers and until a value of the first counter equals a next character in the ciphertext;
store at a memory the pseudo-random number associated with the value of the current counter, where the stored pseudo-random number is an American Standard Code for Information Interchange (ASCII) code;
repeat the previous two steps until all characters in the ciphertext have been associated with an ASCII code;
replace the ASCII codes with characters associated with the ASCII codes;
store at the memory the characters associated with the ASCII codes, where the stored characters are plaintext characters; and
output the plaintext characters;
where the APRNG creating the sequence of pseudo-random numbers is configured to:
create a current seed number;
generate a plurality of large pseudo-random numbers by (a) multiplying the current seed number with a current multiplier, (b) setting (i) the current multiplier equal to a result of a random selection of digits of the current seed number and (ii) the current seed number equal to the large pseudo-random number; and
split at least one large pseudo-random numbers of the plurality of large pseudo-random numbers into a sequence of pseudo-random numbers.

17. The computing apparatus of claim 16, where the secret key comprises:
an initial seed number that is configured to be used as the current seed number prior to modifying a value of the current seed number in step (b)(ii); and
an initial multiplier that is configured to be used as the current multiplier prior to modifying a value of the current multiplier in step (b)(i), where each digit of the initial multiplier is calculated as a first random position selected from the initial seed number multiplied with a result of an integer division of a length in digits of the current seed number by a second random position selected from the current seed number, and where for each digit of the initial multiplier a different first digit and second digit of the initial seed number are used.

18. The computing apparatus of claim 17, wherein it is further configured to:
- reset the first counter to a value of 0 when a pseudo random number matches the ASCII code of the next character in the plaintext;
- reset the current starting point to a value of a next starting point every time the first counter reaches a constant value since the current starting point, where the next starting point is equal to the sum of the current starting point and the constant value; and
- reset the current starting point to a value of a next starting point every time the first counter reaches a pseudo random number, generated by the APRNG, since the current starting point, where the next starting point is equal to the sum of the current starting point and the pseudo random number.

* * * * *